United States Patent [19]

Drechsel et al.

[11] 4,393,032
[45] Jul. 12, 1983

[54] PRODUCTION OF PHOSPHORIC ACID AND ADDITIONAL PRODUCTS FROM PHOSPHATE ORE

[75] Inventors: Erhart K. Drechsel, Montgomery, Tex.; Dysart E. Holcomb; John B. Sardisco, both of Shreveport, La.

[73] Assignee: Pennzoil Company, Houston, Tex.

[21] Appl. No.: 338,999

[22] Filed: Jan. 12, 1982

[51] Int. Cl.$^3$ .................. C01B 25/16; C01B 15/16; C01B 25/26

[52] U.S. Cl. ........................ 423/320; 423/166; 423/319; 423/309; 71/43

[58] Field of Search ............. 423/317, 319, 320, 166, 423/167, 308, 309; 71/43

[56] References Cited

U.S. PATENT DOCUMENTS

| | | | |
|---|---|---|---|
| 2,567,227 | 9/1951 | Miller | 23/109 |
| 2,728,635 | 12/1955 | Miller | 23/109 |
| 2,899,292 | 8/1959 | Vickery | 71/41 |
| 2,914,380 | 11/1959 | Vickery | 23/109 |
| 2,954,275 | 9/1960 | Carothers et al. | 23/88 |
| 3,150,957 | 9/1964 | Seymour et al. | 423/319 |
| 3,401,014 | 9/1968 | Saeman | 23/109 |
| 3,442,610 | 5/1969 | Mustian et al. | 23/165 |
| 3,494,735 | 2/1970 | Cochran | 23/165 |
| 3,645,676 | 2/1972 | Cochran | 23/109 |
| 3,743,725 | 7/1973 | Case | 423/166 |
| 3,919,395 | 11/1975 | Hauge | 423/309 |
| 4,026,995 | 5/1977 | Case | 423/321 R |
| 4,029,743 | 6/1977 | Hauge | 423/320 |
| 4,086,322 | 4/1978 | Drechsel | 423/319 |
| 4,132,760 | 1/1979 | Ore | 423/167 |
| 4,140,748 | 2/1979 | Ore | 423/167 |
| 4,258,007 | 3/1981 | Gragg et al. | 422/189 |
| 4,258,008 | 3/1981 | Gragg et al. | 422/189 |
| 4,260,584 | 4/1981 | Ore et al. | 422/189 |
| 4,276,270 | 6/1981 | Gragg et al. | 423/167 |
| 4,277,448 | 7/1981 | Ore et al. | 423/167 |
| 4,284,614 | 8/1981 | Ore | 423/321 |
| 4,309,395 | 1/1982 | Hauge | 423/320 |

Primary Examiner—O. R. Vertiz
Assistant Examiner—Gregory A. Heiler
Attorney, Agent, or Firm—Lowe, King, Price & Becker

[57] ABSTRACT

Phosphate rock, including low grade phosphate ore, is treated to recover phosphoric acid and other valuable products by a series of steps including contacting phosphate ore with a weak phosphoric acid to form a suspension of at least a portion of the slimes contained in the ore so that the slimes can be separated from the ore, and separating the slimes to provide a deslimed phosphate ore. Deslimed phosphate rock is solubilized with phosphoric acid to convert at least a portion of the calcium contained in the rock and form a solution of monocalcium phosphate and phosphoric acid. After removal of solids, this solution can be treated with sulfuric acid in a gypsum crystallizer to form gypsum and the phosphoric acid product wherein filterable gypsum crystals are obtained by maintaining a total $SO_3$ content of 1.5–4 wt. % in a first crystallizer and neutralizing the $SO_3$ in a second crystallizer. In other aspects of the invention, at least a portion of the phosphoric acid produced may be recycled to convert additional ore and the slime suspension may be treated to recover the weak acid recovered from the suspension. Further, wash water from the gypsum filter may be recycled to the desliming stage, the filtrate from the deslimer may be cycled to the acidulation reactor and monocalcium phosphate may be recovered as a separate product from phosphoric acid and connected to other useful products.

55 Claims, 5 Drawing Figures

PRODUCTION OF PHOSPHORIC ACID AND ADDITIONAL PRODUCTS FROM PHOSPHATE ORE

CROSS REFERENCE TO RELATED APPLICATIONS

This application is related to U.S. Pat. Nos. 4,086,322, issued Apr. 25, 1978 and 4,160,657, issued July 10, 1979, and to application Ser. No. 338,998, filed Jan. 12, 1982.

TECHNICAL FIELD

This invention relates to a method for the production of phosphoric acid and optionally monocalcium phosphate and/or co-products, by the initial acidulation of phosphate rock with phosphoric acid and more particularly relates to methods for the conversion of low grade phosphate rock into useful products.

BACKGROUND ART

Phosphate rock is any ore that contains one or more phosphatic minerals of sufficient purity and quantity to permit its commercial use as a source of phosphatic compounds or elemental phosphorous. This definition is essentially economic rather than geologic, for if a rock can be utilized for the indicated purpose it is a phosphate rock. Phosphate rock includes two major subdivisions, the first consisting of crystalline rock with enough of the mineral apatite to be of commercial interest in providing a source of calcium and phosphorous. Fluorapatite is calcium fluorophosphate of the formula $Ca_4(PO_4)_6 \cdot CaF_2$, and is widely distributed in many kinds of rock. The second consists of sedimentary phosphate rock known as phosphorite, the essential mineral of phosphorite being carbonate apatite. In the art, phosphate rock is essentially synonymous with phosphorite.

Phosphate rock of any type is utilized for its phosphatic content with its physical properties being of no concern except in mining and processing. The phosphate content of the rock or ore is expressed in either of two ways. One is the percentage of Bone Phosphate of Lime or "BPL", which is tricalcium phosphate, $Ca_3(PO_4)_2$. The BPL content of beneficiated phosphate rock will generally range from about 50 to 85 percent. The second manner of expressing phosphate content is in terms of phosphorous pentoxide, $P_2O_5$. The ratio of BPL content to $P_2O_5$ content is about 2.18 to 1. Thus, a rock with 60% BPL content contains about 27.5% $P_2O_5$.

As a practical matter, most modern commercial beneficiation plants are designed to process and upgrade phosphate ore to remove slimes and sands so as to provide a phosphate rock in which the BPL content has been upgraded.

Phosphate rock is obtained from underground mining or surface mining of phosphate ore, the latter initially involving the use of large drag line excavators which remove the overburden and then recover the crude phosphate ore which is known as "matrix". The matrix is then washed by hydraulic jets in an improvised sump pit and the resulting mixture of phosphate ore, water, sand and gravel, called the "slurry", is then pumped by pipeline to a washing plant. In the washing plant the phosphate ore is sized and concentrated so that an original matrix which could have a BPL content in the range of 20–30% may be upgraded to a phosphate rock having a higher BPL content, e.g. in the range of 70% or higher. In the treatment plant, the matrix is initially washed to provide a pebble product and a flotation feed, with slimes having been removed. The slimes are discarded and the pebble may be suitable for sale or may be blended with other high grade concentrate. The flotation feed is passed to a flotation plant where a high-grade concentrate product is separated from sand tailings. The slimes and sand are normally discarded into slime ponds and the like.

Of the products from the beneficiation plant, only the concentrate will normally have a sufficiently high BPL content to be used in commercial phosphoric acid plants for the production of phosphoric acid and/or the production of other useful materials containing calcium and phosphorous. Accordingly, most phosphoric acid plants are suitable only for handling a feedstock having a relatively high BPL content such as the concentrate product which is obtained from flotation.

The pebble product has a size ranging from $\frac{1}{4}''$ to $+14$ mesh and a BPL value ranging from 38 to about 68 (17.4–31.2% $P_2O_5$). With the declining quality of rock, in recent years small amounts of pebble have been ground and blended into higher quality, beneficiated rock. In the past, pebble having a BPL value higher than 58 (26.6% $P_2O_5$) was stored while the lower grade, high alumina pebble was discarded with the tailings.

The pebble is obtained by screening "as mined" rock and retaining the $+14$ mesh or "pebble" fraction, but in recent years some pebble has been retained from screening at $+10$ mesh.

In spite of the tremendous reserve of $P_2O_5$ which the high alumina pebble represents, it is not processed because of its high content of metal compounds such as compounds of calcium, magnesium, aluminum and iron. This is due in part to a need to produce phosphoric acid of low metallic ion content that can be readily converted to superphosphoric acid (70–76% $P_2O_5$) for use in liquid fertilizer manufacture.

When high alumina phosphate pebble rock is digested with phosphoric acid and sulfuric acid to form aqueous phosphoric acid and calcium sulfate by the usual gypsum processes, a great many soluble metallic phosphates are formed. When the phosphoric acid is concentrated to merchant grade phosphoric acid and superphosphoric acid, after removal of the solid calcium sulfate and gangue and after clarification, the presence of the soluble metallic phosphate values greatly increases the viscosity of the phosphoric acid. The viscosity of the phosphoric acid can increase to such an extent that the phosphoric acid cannot be handled or transported as a fluid. As the concentration of phosphoric acid is increased, the solubility of the metallic phosphates sharply decreases to form sludges, scale and complex precipitates in phosphoric acid. These sludges settle out in the phosphoric acid creating storage, handling and transportation problems for the acid. In addition, formation of sludges, scale and precipitates causes an appreciable loss of the $P_2O_5$ values in the phosphoric acid.

In Central Florida, the pebble is coarser, generally has a BPL value around 68 (31% $P_2O_5$) and is of lower metallic content than Northern Florida pebble. This pebble presently has a market value because it may be used as a feed to electric furnaces to produce elemental phosphorous and can also be used with phosphate rock within restrictions imposed by product quality standards.

However, high alumina pebble inventory in Central Florida also increased with increased emphasis on low metallic content phosphoric acid which can be converted to high quality superphosphoric acid. This made even more remote the processing of high alumina pebble by the usual gypsum type wet process, in both Central and certainly Northern Florida.

Beneficiated phosphate rock also contains metallic impurities, though less than a high alumina pebble, which are undesirable and complicate the production of superphosphoric acid due to the metallic phosphate complexes that are formed which increase the viscosity of the acid and form sludges which settle and can result in a $P_2O_5$ loss if not recycled.

There has been substantial work in the art in an effort to upgrade phosphate ore or matrix and/or utilize low-grade phosphatic materials in order to obviate the requirements of the expensive beneficiation processes and loss of $P_2O_5$ content. For example, U.S. Pat. Nos. 2,143,865, 3,391,993, 4,042,666, and 4,113,184 describe various methods for treatment of phosphate rock prior to acidulation with sulfuric acid in a conventional phosphoric acid plant. In all of these prior patents, the phosphate ore is treated as with steam as in U.S. Pat. No. 2,143,865 to eliminate fluorine; with water and a defoaming agent as in U.S. Pat. No. 3,391,993 in producing dicalcium phosphate; formed into an aqueous slurry with a viscosity reducing agent as in U.S. Pat. No. 4,042,666 to reduce clay-swelling problems; or, combined with an additive for wet grinding of the rock as in U.S. Pat. No. 4,113,184.

In U.S. Pat. No. 2,571,866, there is described a process for the production of phosphate concentrate from Florida phosphate rock in which water is used to separate the slime or clay from the larger useful particles of phosphate followed by further processing to produce a phosphate concentrate. In U.S. Pat. No. 4,105,749, phosphoric acid is produced from a phosphate ore matrix which has been slurried with an organic solvent to remove impurities prior to acidulation with sulfuric acid.

British Pat. No. 852,538 discloses a process for enriching natural phosphates by reacting phosphate ore at temperatures of no higher than 50° C. with a dilute phosphoric acid solution which will impregnate the ore and cause impurities to flow away in the form of a solution. This treatment is to enrich the proportion of lime in the original ore and remove slimes and the like.

Phosphate rock feed of sufficiently high BPL content is currently processed in so-called wet process phosphoric acid plants utilizing a basic and well-known procedure for the acidulation of the phosphate rock by reaction of the rock with sulfuric acid to form phosphoric acid with subsequent reaction of the phosphoric acid, with for example, ammonia to produce monoammonium phosphate (MAP) and diammonium phosphate (DAP). The phorphoric acid formed in this process is marketable wet process phosphoric acid. In this reaction, a by-product is gypsum having the chemical formula $CaSO_4.2H_2O$. The BPL content of the rock used as feedstock in such processes will range from about 58% to about 68% BPL.

In these systems, the conventional wet process phosphoric acid technology accomplishes two primary objectives, namely: (1) phosphate rock acidulation, and (2) the growth of readily filterable calcium sulfate crystals either as the dihydrate (gypsum), or as the hemihydrate. Conventional phosphoric acid technology carries out both of these objectives essentially simultaneously which leads to a number of environmental and purification problems. The presence of excess strong sulfuric acid in the acidulation phase releases fluorides as HF, $SiF_4$ and/or $H_2SiF_6$. This poses serious fluoride emission and subsequent recovery problems. Furthermore, unless excess sulfate levels are carefully and closely controlled, minute gypsum crystals can and will blind rock particles and usually result in poor $P_2O_5$ recovery. The presence of free $H_2SiF_6$ in the acid system leads to severe scaling and excessive maintenance costs even with improved design features to minimize this effect.

Prior art is also known which acidulates phosphate rock with phosphoric acid and then recovers solid monocalcium phosphate by cooling the resulting solution and recovering the monocalcium phosphate. Processes of this type are disclosed, for example, in U.S. Pat. Nos. 2,567,227, 2,728,635, 3,494,735, and 3,645,676. None of these prior art processes, however, are concerned with low grade feedstocks.

In the above-identified previously issued U.S. Pat. Nos. 4,086,322 and 5,160,657 of this assignee, there are disclosed processes by which phosphate rock may be acidulated with phosphoric acid in the presence of potassium ion and silicon dioxide. These processes are useful as effective procedures for the elimination of fluoride evolution. The latest technology concerning this problem is the above-mentioned U.S. Pat. No. 4,160,657, which represents a departure from prior processes in providing for more economic utilization of potassium fluosilicate in the system wherein both phosphoric acid and potassium ion are regenerated and reused as essential reactants.

U.S. Pat. Nos. 3,619,136 and 3,792,151 to Case disclose the reaction of phosphate rock with recycle phosphoric acid at temperatures of about 125°-180° F. (52°-83° C.) to form a solution of monocalcium phosphate in phosphoric acid, removing insolubles, and reacting the phosphoric acid solution with sulfuric acid to produce phosphoric acid and hydrated calcium sulfate, separating the hydrated crystals and recycling at least a portion of the phosphoric acid to the phosphate rock acidulation. These patents point out that under the conditions cited, fluorides are not substantially evolved but remain primarily unreacted and may be found with insoluble materials although a portion remains in the phosphoric acid solution product. These patents state that any grade of phosphate rock can be utilized in the process including mine run rock and Florida pebble rock. This patentee attempts to remove the slimes contained in low grade rock by settling and filtration. The working examples show treatment only of 70 BPL rock.

A substantial problem faced by the prior art in processing low-grade phosphate rock for the production of phosphoric acid and other products is the relative substantial proportion of slimes, sand and other components contained in the rock. These materials interfere in processing of the rock and particularly in the ability to obtain filterable gypsum crystals from the reaction product so as to provide the phosphoric acid material. Substantial prior teachings are available which show that the art has attempted to overcome this problem by various procedures to separate the silica, slimes and other insolubles. For example, U.S. Pat. Nos. 2,899,292 and 2,914,380 to Vickery describe processes wherein the phosphate rock is crushed, dissolved in phosphoric acid, and then attempts made to remove the silica and other insolubles in a separator. In U.S. Pat. No. 2,954,275 to Carothers et al., lime, which is more alkaline than phosphate rock, is added to phosphoric acid solutions and the mixture is then cooled so that a mixture of monocalcium phosphate and impurities are separated.

In U.S. Pat. No. 3,150,957 of Seymour et al, and in unpublished work by Seymour et al, low grade phosphate rock is acidulated with phosphoric acid and the impurities are decanted from the reaction mixture to provide a high grade phosphate rock. Thus, this process effects an initial partial digestion of the rock to extract monocalcium phosphate and other soluble and colloidal phosphates from the rock in fluid form. The unreacted rock residue may then be treated conventionally.

U.S. Pat. No. 4,284,614 to Ore describes a process wherein high alumina phosphate rock such as pebble, with or without comminution, is digested in phosphoric and sulfuric acid and the resultant phosphoric acid contains the metallic ions normally present in the treated rock and pebble. The metallic ions are then extracted from the acid by ion exchange with a water-immiscible organic sulphonic acid compound. After phase separation the organic phase containing the extracted metallic ions can be regenerated.

U.S. Pat. No. 3,919,395 describes an extraction process for the recovery of phosphorus compounds from both high and low grade phosphate ores, especially apatite-containing ores, using room temperature extraction of coarsely ground ore with dilute mineral acids in order to remove dissolved $R_2O_3$ impurities from the ore to upgrade the ore. In this patent, the low grade rock is initially treated with a dilute mineral acid, separating the spent acid which contains colloidol silicates, fines, and dissolved phosphates, and then reacting the residue with a stronger acid. In related U.S. Pat. No. 4,029,743, phosphate rock is acidulated with a mixture of phosphoric acid, sulfuric acid and water in a first mix tank and with sulfuric acid in a second mix tank, in the production and recovery of phosphoric acid. Gypsum is also recycled to the first attack stage. The patentee suggests that low grade rock can be used in the process.

Other patents are known which treat phosphate rock in order to remove slimes, silicas and other insolubles by various methods including the use of water and weak phosphoric acid. However, none of these patents describe a method whereby the rock can be placed in a form suitable for subsequent acidulation by phosphoric acid to recover valuable products wherein the insolubles are removed from the system and fluoride evolution is substantially reduced.

In none of this prior work are there described processes by which very low grade phosphate rock or ore such as matrix is processed in a wet process phosphoric acid plant to produce marketable wet process phosphoric acid, together with other useful and marketable products. The present invention meets this need in the art.

DISCLOSURE OF INVENTION

It is accordingly one object of this invention to produce marketable grade wet process grade phosphoric acid from ground or unground low grade phosphate rock including phosphate matrix ore.

A still further object of the invention is to provide a multi-step process for the treatment of low grade phosphate rock by the acidulation of the rock with phosphoric acid to produce marketable grade phosphoric acid and monocalcium phosphate and other products using procedures which minimize impurities from the rock so that these impurities do not remain in the final product phosphoric acid and monocalcium phosphate.

A further object of the invention is to provide a process wherein phosphoric acid, monocalcium phosphate or mixtures thereof, and alternatively useful fertilizer products, are produced by the acidulation of low grade phosphate rock such as matrix, pebble and/or flotation feed.

An even further object of the invention is to provide a process for the production of valuable products from low grade phosphate rock, which products have impurity levels comparable to those obtained from high grade rock, and to produce a wide variety of useful fertilizer products therefrom.

Other objects and advantages of the present invention will become apparent as the description thereof proceeds.

In satisfaction of the foregoing objects and advantages there is provided by this invention in its broadest embodiment a process for the treatment of phosphate rock to recover valuable products therefrom and, particularly, methods for the production of phosphoric acid from phosphate rock and preferably low grade phosphate rock, by a series of steps comprising:

(a) contacting phosphate rock and preferably low grade phosphate rock with a sufficient amount of phosphoric acid to solubilize the phosphate rock in an acidulator and convert at least a portion of the calcium contained in the rock to form a solution of monocalcium phosphate and phosphoric acid and insolubles;

(b) removing the insolubles from the solution;

(c) reacting a portion of the resultant solution of monocalcium phosphate and phosphoric acid with sulfuric acid in a first gypsum crystallizer to form gypsum and phosphoric acid while maintaining an excess of $SO_3$ in the crystallizer for good gypsum crystal growth;

(d) reacting the remaining portion of the solution of monocalcium phosphate and phosphoric acid with the output from the first crystallizer to neutralize the excess $SO_3$ in a second crystallizer;

(e) removing the output from the second crystallizer and recycling the majority of the slurry to the acidulator while passing the remainder of the slurry to a gypsum separator, the amount of slurry being passed to the gypsum separator being a sufficient amount to remove an amount of $P_2O_5$ from the system which is substantially the same as the amount of $P_2O_5$ entering the system;

(f) separating the gympsum; and (g) recovering the phosphoric acid product.

In a variation on this process, the gypsum slurry from the crystallizer may be passed to a settler from which the overflow phosphoric acid is recycled to the acidulator and the underflow gypsum slurry is divided into two portions, one portion being recycled to first crystallizer and the second portion being passed to the gypsum filter to recover product phosphoric acid.

In a further embodiment of the invention, phosphoric acid is produced from relatively low grade phosphate rock by a series of steps comprising:

(a) contacting low grade phosphate rock or ore with a dilute aqueous solution of phosphoric acid to suspend at least a portion of the slimes contained in the rock so that the slimes can be separated from the rock, dewatered and concentrated;

(b) separating the slimes to provide a deslimed phosphate rock;

(c) contacting said deslimed phosphate rock with a sufficient amount of phosphoric acid to solubilize the phosphate rock and convert at least a portion of the calcium contained in the rock to form a solution of monocalcium phosphate and phosphoric acid and insolubles;

(d) removing the insolubles from the solution;

(e) reacting the resultant solution of monocalcium phosphate and phosphoric acid with sulfuric acid in a gypsum crystallizer to form gypsum and phosphoric acid while maintaining an excess of $SO_3$ in the crystallizer for good gypsum crystal growth;

(e) removing the output from the second crystallizer and recycling the majority of the slurry to the acidulator while passing the remainder of the slurry to a gypsum separator, the amount of slurry being passed to the gypsum separator being a sufficient amount to remove an amount of $P_2O_5$ from the system which is substantially the same as the amount of $P_2O_5$ entering the system;

(f) separating the gypsum; and (g) recovering the phosphoric acid product.

In a variation on this process, the gypsum slurry from the crystallizer may be passed to a settler from which the overflow phosphoric acid is recycled to the acidulator and the underflow gypsum slurry is divided into two portions, one portion being recycled to first crystallizer and the second portion being passed to the gypsum filter to recover product phosphoric acid.

In other aspects of the invention, at least a portion of the phosphoric acid product may be recycled to the solubilization stage and the slime suspension may be treated to recycle weak phosphoric acid recovered from the suspension. Further, a slurry from the gypsum filter may be recycled to the solubilization stage, and filtrate from the deslimer may be cycled to the acidulation reactor, and monocalcium phosphate may be recovered as a separate product from phosphoric acid. Also, the monocalcium phosphate and/or phosphoric acid may be converted into other products. Thus, several options are available in the process depending on the products desired to be produced as well as the purity of the starting materials and the availability of phosphoric acid.

BRIEF DESCRIPTION OF THE DRAWINGS

Reference is now made to the drawings accompanying this application wherein.

BEST MODE FOR CARRYING OUT THE INVENTION

Figure 1:
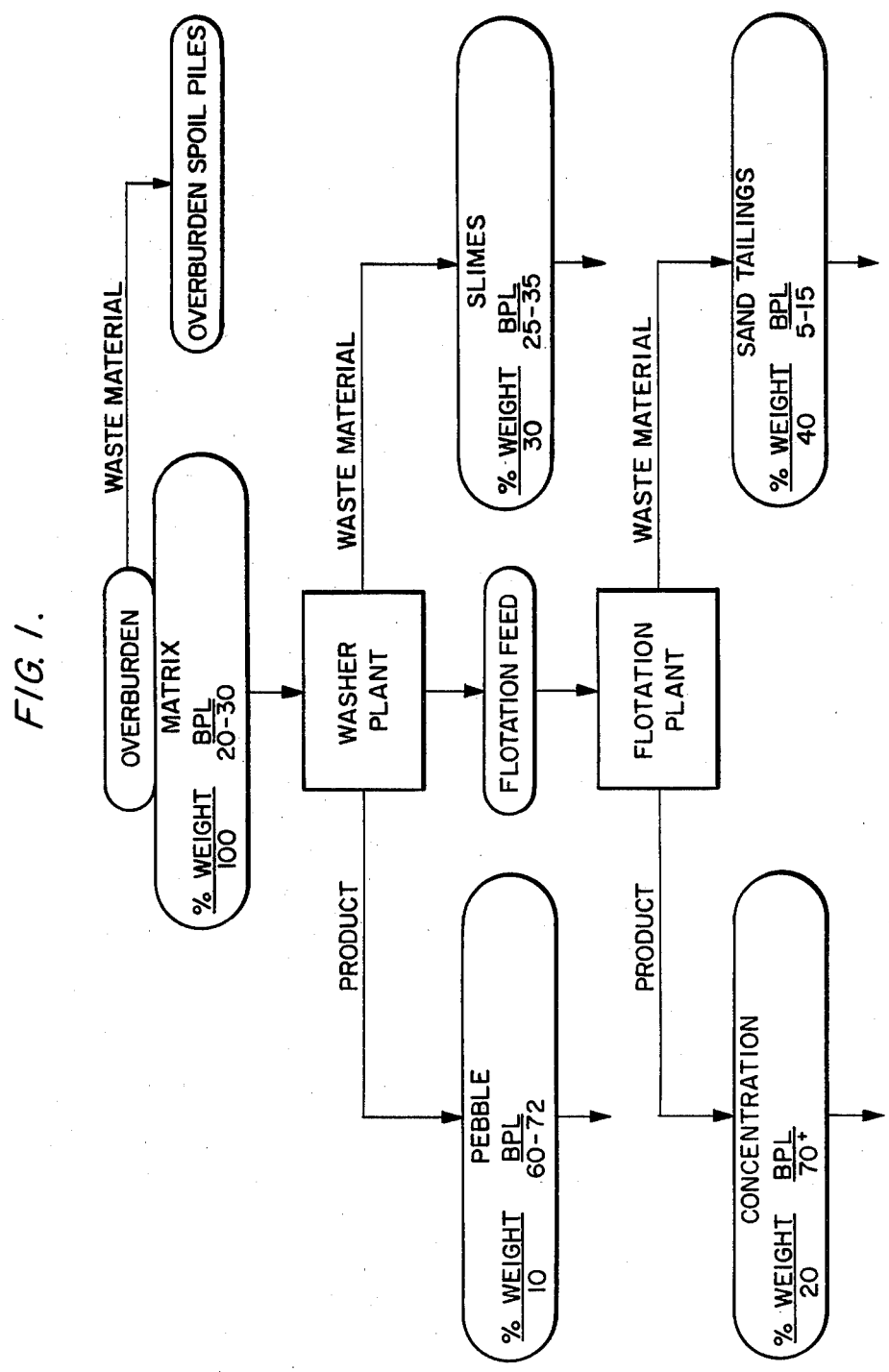
FIG. 1 is a typical example of a phosphate beneficiation plant showing how phosphate ore is processed to remove impurities and the several useful and waste products produced.

This invention is concerned with a multistep procedure for the preparation of marketable phosphoric acid as the main product. Alternatively, the production of gypsum and fertilizer products including monocalcium phosphate may be carried out where phosphate rock is initially solubilized or acidulated with phosphoric acid to produce monocalcium phosphate, which then may be reacted with sulfuric acid to produce filterable gypsum and phosphoric acid. The invention provides advantages in that almost any grade of phosphate rock can be utilized in the invention including very low grades as the process provides means for handling and removal of impurities. Moreover, the process also provides a system which causes a good gypsum crystal growth and filterable gypsum crystals. This has been a substantial problem in prior processes of this type. In the process of the invention, good crystal growth of gypsum is achieved by control of the free $SO_3$ content, high solids content and recycle of gypsum crystals in the crystallizers.

As pointed out above, in prior art processes for the production of phosphoric acid by acidulation of phosphate rock with sulfuric acid, it has been necessary that the phosphate rock have been upgraded so as to have a BPL content in the range of 58 to 68% and preferably higher. In recent years, the availability of high grade phosphate rock has been declining so that the current definition of low grade phosphate rock includes any phosphate rock which has a BPL value of less than about 62%. The present invention provides a novel process by which low grade phosphate rock, including phosphate ore as mined or "matrix", may be processed to produce marketable phosphoric acid and gypsum.

The present invention has the substantial economic advantage in that phosphate ore or matrix, pebble or flotation feed, can be utilized as the feedstock to the acidulation process. As pointed out above with respect to the prior art, present commercial phosphoric acid plants require that the phosphate rock be the concentrate product from the flotation step which has a BPL content of 58 to about 68%. As can be appreciated, the present invention, therefore, can utilize phosphate ores without the necessity of processing through a phosphate beneficiation plant so that the initial cost of the starting material is substantially below that required in present commercial phosphoric acid plants. Thus, the process of the present invention can handle phosphate ores which have a low BPL content and accordingly high concentrations of silica and clay. Moreover, the process of the present invention can utilize feedstocks which do not require fine grinding and, in fact, do not require any grinding at all. The feedstock includes those products known in the art as pebble and flotation feed, as well as matrix. Thus, by definition, the present invention can utilize any feedstock having a BPL content of less than about 58% and is particularly economic when utilized with phosphate ore feedstocks which have a BPL content of below about 40% and even below 20%, which at the present time cannot be utilized in any known phosphoric acid commercial operation.

The present invention utilizes several embodiments in achieving the objects of the invention. In one aspect, an acidulation circuit is provided by which pebble or float feed can be fed directly into the phosphoric acid acidulation system. In separate embodiments, where it is desired to acidulate phosphate matrix or ore which has BPL contents in the 20-30% range, the phosphoric acid acidulation unit is combined with a desliming unit for the production of marketable phosphoric acid. In this embodiment, the low grade phosphate ore is initially subjected to a desliming operation to remove slimes and similar impurities from the rock prior to acidulation. In the desliming operation, slimes, but not necessarily sands and the $R_2O_3$ impurities, are removed. It is necessary that slimes be removed since they are not susceptible of processing in the phosphoric acid process of this invention or any other acidulation process of which applicants are aware. In general, the desliming operation is carried out by contacting the phosphate ore with a weak solution of phosphoric acid, i.e., in the range of about 1-5 wt. %, and which can be recycle phosphoric acid. Using this system, it is possible to effect desliming of the rock and remove a slime suspension from the ore. The ore can then be introduced into the phosphoric acid process of this invention, and the slime suspension can be treated to produce a slime solids with 30-70 wt.% moisture.

In order to understand the various terms used herein in defining starting materials or feedstocks, reference is made to FIG. 1 which is a flowsheet showing a conventional phosphate beneficiation plant. As may be seen, the as-mined material is removed as matrix after removal of the overburden as waste material in the initial mining operation. In the example shown, the matrix will have a BPL content in the range of about 20-30%. The term "matrix" is a term of art and is understood by those in the phosphate beneficiation industry as defining the ore as removed from the ground in the mining operation.

The matrix is then formed into a slurry with water and piped to a washer plant where initial separation is made to remove waste material or slimes in which case, as may be seen in the example, BPL contents in the range of about 25-35% are lost by discarding the slimes. The other product removed at this stage is the so-called pebble product which still maintains a BPL content in the range of 60-70% and which is useful in certain areas as described hereinbefore. The pebble product is generally the large particles separated from the main product in the washer plant and is not currently used as such in wet process phosphoric acid plants.

The remaining intermediate product is called flotation feed. This flotation feed is then subjected to a flotation operation by which sand tailings and other waste materials are removed to provide the product which is known as phosphate concentrate which in general, is the feedstock commonly employed in commercial wet process phosphoric acid plants.

As will be seen from the flowsheet of FIG. 1, from the initial mining of the phosphate ore or matrix, as much as 40-50% of the BPL values may be discarded with the slimes and sand tailings. In addition, the several processing steps required to provide a phosphate concentrate is an expensive and time-consuming operation resulting in a substantial need in the art for a process which can accept as feedstock the pebble or flotation feed materials, as well as the matrix or initial phosphate ore. The present invention in the embodiments shown in FIGS. 2, 3, 4, and 5 describe processes by which phosphate ore or matrix, as well as the pebble feed and flotation feed, can be processed to produce marketable phosphoric acid.

In one aspect of the invention, the feedstock to the acidulation unit comprises a phosphate rock which has a BPL content in the range of about 10 to 40%. This means that the feedstock can be pebble, or flotation feed, as well as conventional high-grade phosphate rock as normally used in commercial phosphoric acid operations. It is only necessary that this phosphate rock be deslimed prior to introduction into the acidulation unit. In this operation, the deslimed phosphate rock is passed to an acidulation operation which is preferably conducted in a series of reactors. In this aspect, the deslimed rock is contacted with phosphoric acid, preferably recycle phosphoric acid, having a $P_2O_5$ concentration of about 25-45% by weight. In the acidulators the deslimed rock is contacted with sufficient phosphoric acid to solubilize the rock at temperatures ranging from room temperature up to about 100° C. and more preferably from about 40°-90° C.. The contact with the phosphoric acid is conducted for a sufficient time to complete solubilization with the contact time preferably ranging from about ½ to 8 hours, preferably 1 to 4 hours. Different feeds may of course require different contact times. The amount of phosphoric acid solution necessary to achieve complete solubilization is about 36-90 moles of phosphoric acid for each 6 moles of phosphate contained in the phosphate rock, or a molar ratio of $P_2O_5$ in the acid to $P_2O_5$ of the rock of about 6:1 to 15:1, respectively. The $P_2O_5$ content of the phosphoric acid should range from about 25-45% by weight, and preferably about 28-32% by weight.

On completion of the solubilization reaction, the resulting acidulated mixture will be a slurry rather than a solution of phosphate rock because there will remain impurities in the phosphate rock which are not soluble, such as sand, some residual slimes and in the case of the use of recycle phosphoric acid or gypsum slurry, perhaps some recycled calcium sulphate or gypsum. In a preferred embodiment of the invention, the sand and other insolubles are removed from the acidulated slurry in a separator to separate insolubles and provide a solution of monocalcium phosphate in phosphoric acid. The latter may also contain some fine slimes and other materials. Preferably, the separated sand solids are washed to prevent $P_2O_5$ losses. Prior to separation the acidulated slurry may contain about 1-15 weight percent of suspended solids in the solution of monocalcium phosphate and phosphoric acid. Any suitable separation device can be used to remove sand solids such as a thickener, hydroclone, decanter, log washer, screw classifier, flotation device, or the like. The separations will normally be carried out at the reaction temperature of the acidulated slurry.

At this stage of the process, the resulting solution is then reacted with sulfuric acid to produce gypsum and product phosphoric acid. This aspect may be carried out in various ways, including direct treatment with sulfuric acid after which the gypsum is separated on a gypsum filter and the product acid is recovered. In this embodiment, it is preferred that the contact with sulfuric acid be conducted in a series of reactors with fresh sulfuric acid added only to the initial reactor. The amount of sulfuric acid used is that amount necessary to provide conversion of all the calcium in the calcium phosphate solution. In one embodiment, at least a stoichiometric amount of sulfuric acid and, preferably, a slight excess, should be employed in order to convert all of the monocalcium phosphate to calcium sulphate. In this case, the product from the reaction would be phosphoric acid. In this embodiment, the preferred amount of $SO_3$ which should be present as total $SO_3$ in the first crystallizer is about 1.5 to 4.0 wt.% in the phosphoric acid or liquid phase. This reaction with sulfuric acid is preferably carried out with a contact time of about 2-8, preferably 4-6, hours at a temperature of 50°-80° C.. In the second crystallizer, a sufficient amount of monocalcium phosphate solution is added to the output from the first crystallizer to neutralize the excess $SO_3$. It is necessary to neutralize the $SO_3$ in the recycle acid to prevent excessive gypsum formation in the acidulation reactors where the rock is acidulated with phosphoric acid. Gypsum crystals formed in the acidulators are very small. These small crystals produce too many nucleation sites in the gypsum crystallizer.

In a further embodiment of the invention, when low grade phosphate rock is used as the feed, it is initially subjected to a desliming operation in order that slimes and similar impurities are removed from the rock prior to acidulation. The desliming operation is generally carried out by contacting the crude phosphate rock or ore in a deslimer with a weak solution of phosphoric acid. The solution of phosphoric acid preferably contains phosphoric acid in an amount of about 1-15% by weight. In a particular feature, the phosphoric acid may be provided as recycle phosphoric acid. In the desliming operation, the low grade phosphate rock is contacted with the phosphoric acid in a ratio of liquid to rock of about 2:1 to 10:1. The rock or ore is contacted with the $H_3PO_4$ at a temperature in the range of room temperature up to about 80° C. and preferably about 25°-50° C. The time of contact in the desliming operation ranges from about 1-5 hours. An attrition scrubber, centrifuge, filter, or other solid-liquid separation device may be used as the deslimer apparatus.

The action of the phosphoric acid on the rock forms a slime suspension and it has been found that after the desliming operation is completed, the slime suspension can be separated from the phosphate rock by any convenient separation method such as decanting, filtering and the like. However, a particularly preferred embodiment is to pass the mixture from the deslimer through a separator from which the slime suspension can be recovered. The separation device may be a screw classifier, hydroclone or the like. In a preferred embodiment, the slime suspension is treated with a flocculating agent to effect flocculation of the slime so that they can be separated as in a settler or on a filter. The liquid recovered from the slime filter can then be recycled to the desliming operation. The deslimed rock can then be introduced into the acidulation circuit. The invention for desliming the phosphate ore and recovering $P_2O_5$ values from the slimes is the invention of John B. Sardisco, filed of even date under Ser. No. 333,998.

Further features of the invention include recycle of at least a portion of the product acid to the acidulation to provide sufficient phosphoric acid to effect the acidulation. Further, the gypsum on the gypsum filter can be washed with wash water and this wash water, which will comprise a filtrate containing about 12-28% $P_2O_5$, can be recycled to effect desliming. In further features, the slurry from the acidulators which will contain some finely divided gypsum, can be passed through a suitable separation device to provide a clean monocalcium phosphate in phosphoric acid solution from which the monocalcium phosphate can be recovered. In this embodiment, after recovery of the monocalcium phosphate material, the material is then contacted with sulfuric acid to effect conversion of the monocalcium phosphate to additional phosphoric acid.

In additional embodiments of the invention, the sulfuric acid may be mixed with or partially replaced by potassium bisulphate, $KHSO_4$, and/or potassium sulphate, $K_2SO_4$, by which one can produce gypsum and a solution of $KH_2PO_4$ and phosphoric acid. $KH_2PO_4$ is a high analysis fertilizer material and can be separated and recovered from the phosphoric acid by extraction with a lower alkyl alcohol or by concentration of the phosphoric acid. Methods for conducting these separation procedures and reaction with the $KHSO_4$ or $K_2SO_4$ are known, for example, from U.S. Pat. No. 4,160,657.

Figure 2:
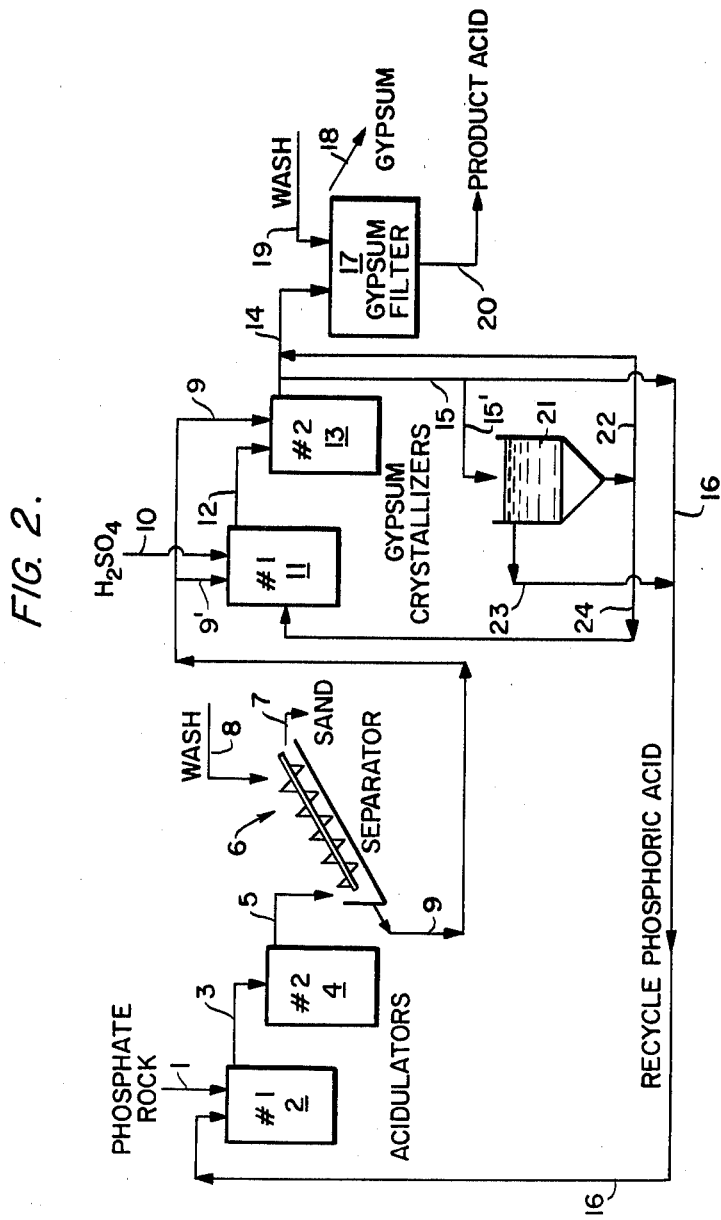
FIG. 2 is a flowsheet showing a broad embodiment of the invention wherein phosphate rock is processed with phosphoric acid, then sulfuric acid, to produce phosphoric acid and gypsum.

Reference is now made to the other drawings accompanying this invention wherein FIG. 2 is a flowsheet for a process wherein phosphate rock having a BPL content as low as 10-40% can be acidulated with phosphoric acid provided by recycle and then the converted calcium is reacted with sulfuric acid to produce phosphoric acid. In this embodiment, phosphate rock from line 1 is passed to No. 1 acidulator 2 for reaction with recycle phosphoric acid from 16. The acidulation mixture from No. 1 acidulator 2 is then passed by line 3 to No. 2 acidulator 4, it being understood that a series of acidulators may be employed to complete the reaction. The acidulation reaction is conducted at a temperature in the range of 40°-90° C., preferably about 60°-80° C. with a residence time of ½-8 hours, preferably 1-4 hours. The $P_2O_5$ concentration in the recycle acid should be about 25-45 wt. %, preferably 28-32 wt. %, with the recycle ratio of $P_2O_5$ in the recycle acid to $P_2O_5$ in the rock being about 7-18, preferably 8-12.

The resulting acidulated slurry in line 5 is then passed to a separation device 6 for removal of sands at 7. The sands in the separation device are washed by wash water from 8 and the resulting monocalcium phosphate solution is recovered at 9. This monocalcium phosphate solution may contain some slimes and some finely divided calcium sulphate crystals which are produced in the acidulators but they do not pose a problem in the process.

This mixture is then passed to the gypsum crystallizers via line 9 wherein, in the preferred embodiment, the stream 9 is split into two streams, 9 and 9', for reaction in gypsum crystallizers 11 and 13. Sulfuric acid is preferably fed from line 10 only into the No. 1 crystallizer. The mixture from the No. 1 crystallizer is then passed by line 12 to No. 2 crystallizer 13. The ratio of monocalcium phosphate-phosphoric acid feed rate between the two crystallizers should be such that the total $SO_3$ solution concentration in the first crystallizer 11 is about 1.5-4.0, preferably 2.0-3.5, as explained above and the CaO equivalent is equal to or greater than the $SO_3$ equivalent in crystallizer 13. The residence time in each crystallizer is about 1 to 3 hours, preferably 2 hours, and the temperature in each crystallizer is about 50°-75° C., preferably 65°-70° C. In a preferred embodiment, the gypsum solids content in the crystallizer is in the range of about 10 to 35 wt.%. Use of a thickener after the second crystallizer may be used so that crystals can be recycled for good crystal growth. It is desirable to have a solids content of 25 to 35% in the crystallizers to effect good gypsum growth.

At this stage the gypsum slurry in line 14 may be treated by several embodiments. In a preferred aspect, a portion of the slurry in line 14 is removed at 15 and continuously recycled via line 16 to acidulator 2. With this system the amount of slurry from line 14 entering gypsum filter 17 is equivalent in total amount of $P_2O_5$ to the $P_2O_5$ entering the system with the phosphate rock. From the filter 17, the gypsum solids are recovered at 18 after being washed with water from 19, the wash water being recycled to the system. Product phosphoric acid is recovered at 20. This embodiment provides a high solids content in the crystallizers to grow larger crystals.

In a second preferred aspect, all of the gypsum slurry from line 14 is removed by line 15, then through line 15' to settler 21. From settler 21, the overflow phosphoric acid is recycled by line 23 to acidulator 2. The underflow, which is now a concentrated gypsum slurry is divided into two portions. One portion is recycled to the No. 1 crystallizer 11 via line 24 and the other portion is passed by line 22 to the gypsum filter 17 for phosphoric acid recovery as described above. The amount of underflow to the gypsum filter removes a total amount of $P_2O_5$ from the system for product recovery which is equivalent to the $P_2O_5$ entering the system. The advantage of this embodiment is to increase the solids content in the crystallizers to grow larger crystals and also to reduce the volume of slurry to the separators.

It will be seen from the description of FIG. 2 that a marketable grade phosphoric acid can be produced from low grade phosphate ore since the process separates the rock acidulation and gypsum formation phases. Further, since the sands and other insolubles are removed between these phases, the insolubles do not interfere in the gypsum formation phase.

A number of variations are available, of course, in this embodiment. For example, in the process of FIG. 2, where it is desired to remove and recover monocalcium phosphate in its solution in phosphoric acid, a side stream of the monocalcium phosphate solution may be removed from line 9. The monocalcium phosphate solution can then be continuously cycled through a vacuum crystallizer with a portion of the monocalcium phosphate removed therefrom. The monocalcium phosphate may then be processed for recovery and conversion to other useful products as described hereinafter.

Figure 3:
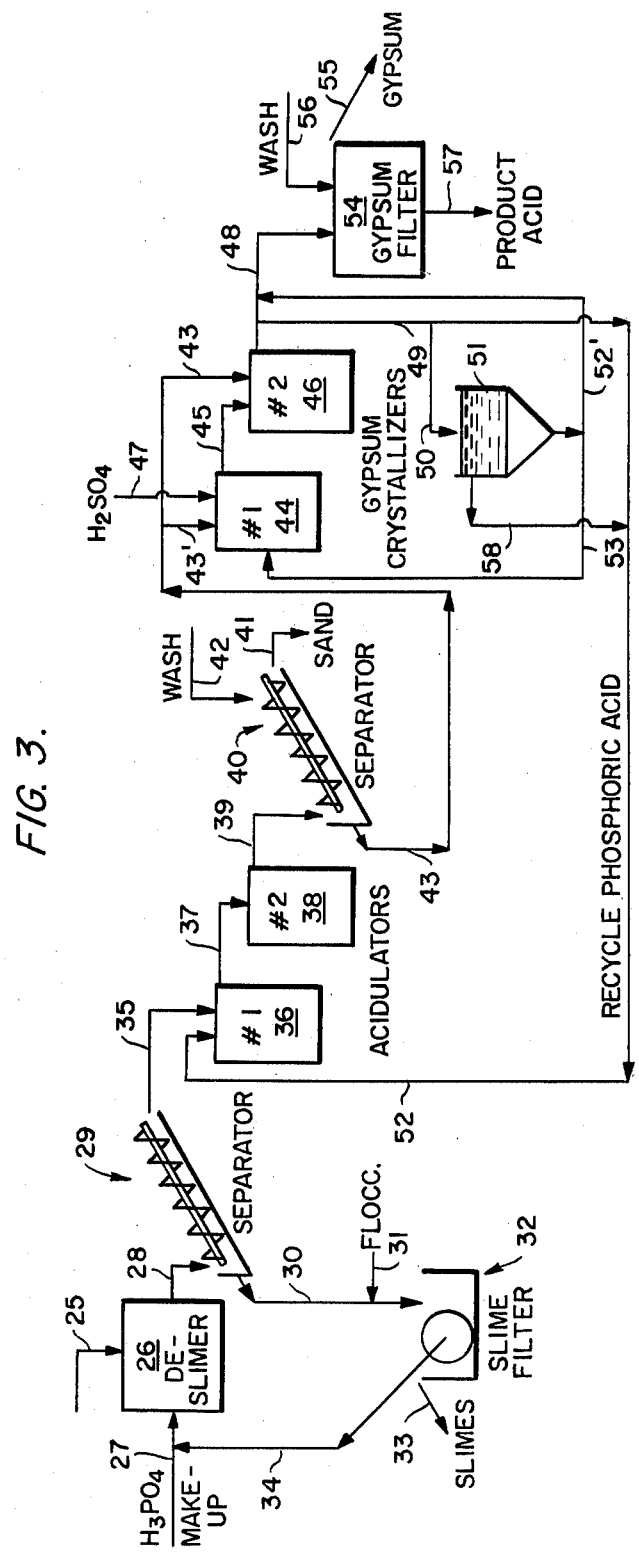
FIG. 3 is a flowsheet showing a broad embodiment of the invention wherein the phosphate rock is initially deslimed with phosphoric acid and then processed with phosphoric acid and sulfuric acid to produce phosphoric acid and gypsum.

A further embodiment of the invention is shown in FIG. 3 which describes a process for processing low grade phosphate rock such as ore or matrix. In this process, the ore or matrix is deslimed with $H_3PO_4$, acidulated with phosphoric acid provided by recycle and then the monocalcium phosphate solution is reacted with sulfuric acid to produce phosphoric acid. In this embodiment, phosphate ore, such as matrix from line 25 is deslimed in deslimer 26, e.g. ball mill or attrition scrubber, by contact with about 2-10 parts of weak phosphoric acid per part of phosphate ore. The weak acid is preferably of a concentration of about 1-20 wt.% and is introduced by line 27. A series of desliming steps may be used. The reaction with the ore forms a slime suspension or emulsion which is separated by passing the desliming mixture by line 28 to a separator 29. In separator 29, the slime suspension is separated by line 30 from the deslimed ore. The slime suspension is then preferably mixed with a flocculant from line 31 and the mixture is passed to a separator such as slime filter 32 from which the slimes are removed by line 33. The remaining liquids, which comprise a weak phosphoric acid solution are recycled by line 34 to line 27 to effect further desliming of phosphate ore. The flocculation of the slimes is rapid so that the sliming nature of these impurities do not represent substantial holdup in the system. The desliming step removes at least a portion of the silicas contained in the ore. The slimes further contain sufficient insoluble $P_2O_5$ from the rock so that they can be converted into normal superphosphate or triple superphosphate as, by example, by reaction with sulfuric acid or phosphoric acid, respectively.

The deslimed ore or phosphate rock from line 35 is then passed to No. 1 acidulator 36 for acidulation with recycle phosphoric acid from 52. The acidulating mixture from the No. 1 acidulator 36 is then passed by line 37 to No. 2 acidulator 38, it being understood that a series of acidulators may be employed to effect complete reaction. The acidulation reaction is conducted at a temperature in the range of 40°–90° C., preferably about 60°–80° C. with a residence time of ½–8 hours, preferably 1–4 hours. The $P_2O_5$ concentration in the recycle acid should be about 25–45 wt.%, preferably 28–32 wt.%, with the recycle ratio of $P_2O_5$ in the recycle acid to $P_2O_5$ in the rock being about 7–18, preferably 8–12.

At this stage the gypsum slurry in line 48 may be treated by the embodiments described in FIG. 2. Thus, a portion of the slurry in line 48 is removed at 49 and continuously recycled via line 52 to acidulator 36. With this system the amount of slurry from line 48 entering gypsum filter 54 is equivalent in total amount of $P_2O_5$ to the $P_2O_5$ entering the system with the phosphate rock. From the filter 54, the gypsum solids are recovered at 55 after being washed with water from 56, the wash water being recycled to the system. Product phosphoric acid is recovered at 57. This embodiment provides a high solids content in the crystallizers to grow larger crystals.

In a second preferred aspect, all of the gypsum slurry from line 48 is removed by line 49, then through line 50 to settler 51. From settler 51, the overflow phosphoric acid is recycled by lines 58 and 52 to acidulator 36. The underflow, which is now a concentrated gypsum slurry is divided into two portions. One portion is recycled to the No. 1 crystallizer 44 via line 53 and the other portion is passed by line 52' to the gypsum filter 54 for phosphoric acid recovery as described above. The amount of underflow to the gypsum filter removes a total amount of $P_2O_5$ from the system for product recovery which is equivalent to the $P_2O_5$ entering the system. The advantage of this embodiment is to increase the solids content in the crystallizers to grow larger crystals and also to reduce the volume of slurry to the separators.

The resulting acidulated slurry in line 39 is then passed to a separation device for removal of sands at 41. The solids are washed by wash water from 42 and the resulting monocalcium phosphate solution is recovered at 43. This monocalcium phosphate solution will contain some slimes and some finely divided calcium sulphate crystals from the recycle acid, none of which adversely affect growth of good gypsum crystals.

This mixture is then passed to the gypsum crystallizers via line 43 wherein, in the preferred embodiment, it is split into two streams, 43 and 43', for acidulation in gypsum crystallizers 44 and 46. Sulfuric acid is preferably fed from line 47 only into the No. 1 crystallizer. The mixture from the No. 1 crystallizer is then passed by line 45 into No. 2 crystallizer 46. The ratio of monocalcium phosphate-phosphoric acid solution feed rate between the two crystallizers should be such that the $SO_3$ concentration in the liquids in crystallizer 44 is about 1.5–4.0, preferably 2.0–3.5, and the CaO equivalent is equal to or slightly greater than the $SO_3$ equivalent in crystallizer 46. The residence time in each crystallizer is about 2 to 4 hours, preferably 3 hours, and the temperature in each crystallizer is about 50°–75° C., preferably 65°–70° C.

Figure 4:
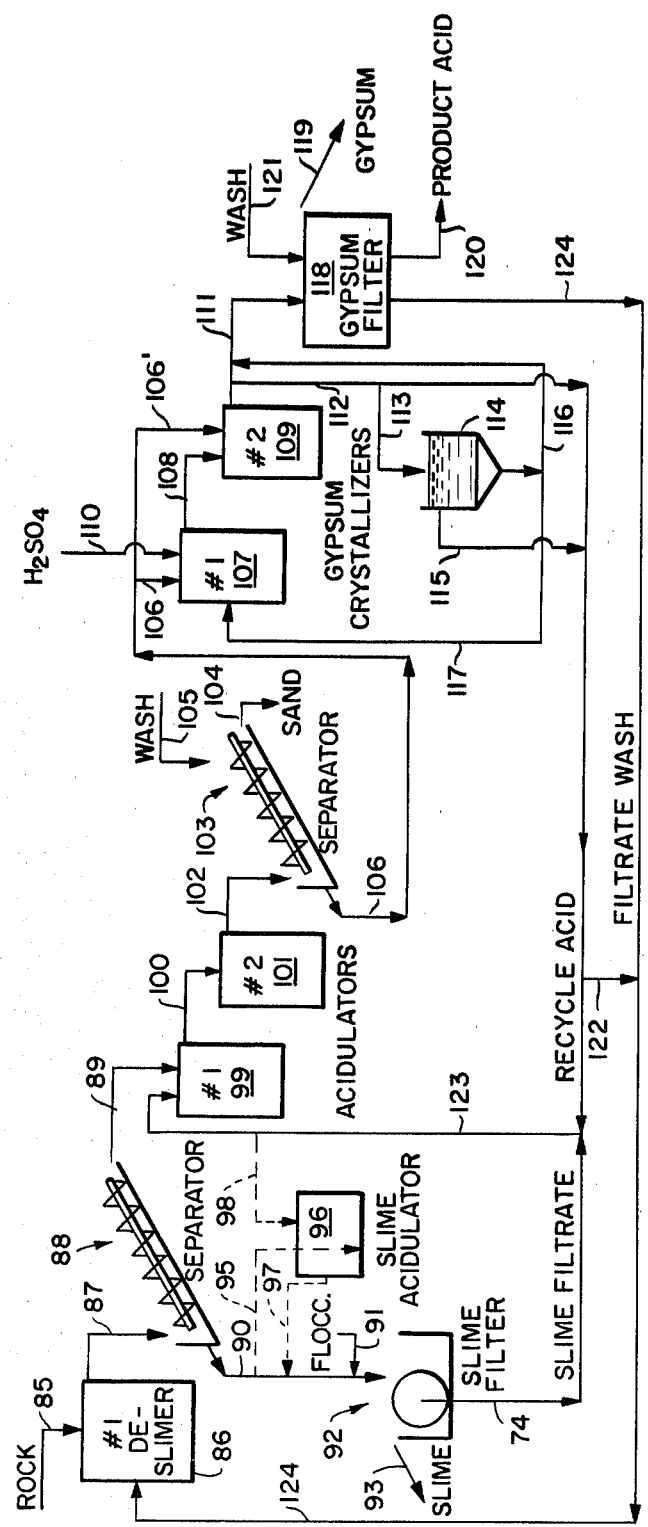
FIG. 4 is an embodiment of the invention wherein a gypsum slurry is recycled for initial treatment of the rock and the product is phosphoric acid.

A further embodiment of the invention is shown in FIG. 4. This embodiment is especially preferred for low grade rock or ore such as matrix since the processing techniques prevent the usual substantial losses of $P_2O_5$. In this process, the crude rock or ore is initially subjected to desliming by contact with recycle phosphoric acid liquids containing $P_2O_5$ and particularly the wash water containing $H_3PO_4$ obtained from the gypsum filter or gypsum pond which will contain a $P_2O_5$ content in the range from about 1–20 weight percent. Referring now particularly to FIG. 4, it will be seen that phosphate rock, preferably matrix, from line 85 is contacted with recycle strong wash water containing $H_3PO_4$ via line 124 from the gypsum pond or filter in deslimer 86. The resulting deslimed mixture is then passed by line 87 to a separator such as screw classifier 88, wherein the phosphoric acid solution containing the slimes is removed by line 90, a flocculant is added at line 91, and the mixture passed to a separator such as slime filter 92 from which the slimes are removed at 93. The slime filtrate from the slime filter 92 is passed by line 94 for mixture with the recycle acid being sent to the acidulators by line 123. The slimes at 93 can be further reacted with sulfuric acid to form triple superphosphate or with phosphoric acid to produce normal superphosphate.

In an alternative embodiment, at least a portion of the slime suspension from line 90 may be passed by broken line 95 to slime acidulator 96 where it is reacted with at least a stoichiometric amount, and preferably an excess, of recycle phosphoric acid from line 98. Gypsum may be added to facilitate separation of the slimes. This reaction serves to complete acidulation of insoluble $P_2O_5$ in the slimes.

In the desliming step with wash water from the gypsum filter or pond, the temperature of the treatment should be between about 20° and 50° C. with residence time in the deslimer in the range of 0.5–2 hours. The $P_2O_5$ concentration in the wash from the gypsum filter should not exceed about 25 weight percent with the preferred $P_2O_5$ concentration being about 1–20 weight percent.

The acidulation of the slime slurry with the recycle phosphoric acid is to extract the insoluble rock and $P_2O_5$ values contained in the slime. Acidulation can be obtained by the addition of recycle acid to the slurry and heating at 40°–80° C. The gypsum is added to improve the filtration of the remaining slimes.

In the meantime, the deslimed rock is removed by line 89 from the separator 88 to acidulators 99 and 101 where acidulation is conducted with recycle phosphoric acid from line 123. The acidulation in acidulator 99 is completed as described for FIG. 2 and the mixture is then removed by line 100 to acidulator 101 where the acidulation is continued as described in FIG. 2. The resulting solubilized solution of monocalcium phosphate in phosphoric acid containing suspended solids is produced and is then passed by line 102 to separator 103 to remove sands at 104. The solids are washed by water from line 105 and the resulting mixture is removed by line 106 and split into two portions 106 and 106' and sent to gypsum crystallizers 107 and 109, the slurry from crystallizer 107 being sent to crystallizer 109 via line 108. The stream is split to provide an $SO_3$ excess in the first crystallizer and neutralize the $SO_3$ in the second crystallizer as described in FIGS. 2 and 3. Thus, sulfuric acid is added to the No. 1 crystallizer by line 110 as described for FIG. 2. The gypsum slurry is then removed by line 111 and treated as described for FIGS. 2 and 3. Thus, the gypsum slurry in line 111 may be treated by several embodiments. In a preferred aspect, a portion of the slurry in line 111 is removed at 112 and continuously recycled via line 123 to acidulator 99. With this system the amount of slurry from line 111 entering gypsum filter 118 is equivalent in total amount of $P_2O_5$ to the $P_2O_5$ entering the system with the phosphate rock. From the filter 118, the gypsum solids are recovered at 119 after being washed with water from 121. The wash water being recycled via line 124 to the deslimer 86 as weak phosphoric acid. Product phosphoric acid is recovered at 120. This embodiment provides a high solids content in the crystallizers to grow larger crystals.

In a second preferred aspect, all of the gypsum slurry from line 111 is removed by line 112, then through line 113 to settler 114. From settler 114, the overflow phosphoric acid is recycled by lines 115 and 123 to acidulator 99. A portion may be removed at 122 to adjust the concentration of the filtrate wash. The underflow, which is now a concentrated gypsum slurry is divided into two portions. One portion is recycled to the No. 1 crystallizer 107 via line 117 and the other portion is passed by line 116 to the gypsum filter 118 for phosphoric acid recovery as described above. The amount of underflow to the gypsum filter removes a total amount of $P_2O_5$ from the system for product recovery which is equivalent to the $P_2O_5$ entering the system. The advantage of this embodiment is to increase the solids content in the crystallizers to grow larger crystals and also to reduce the volume of slurry to the separators.

Figure 5:
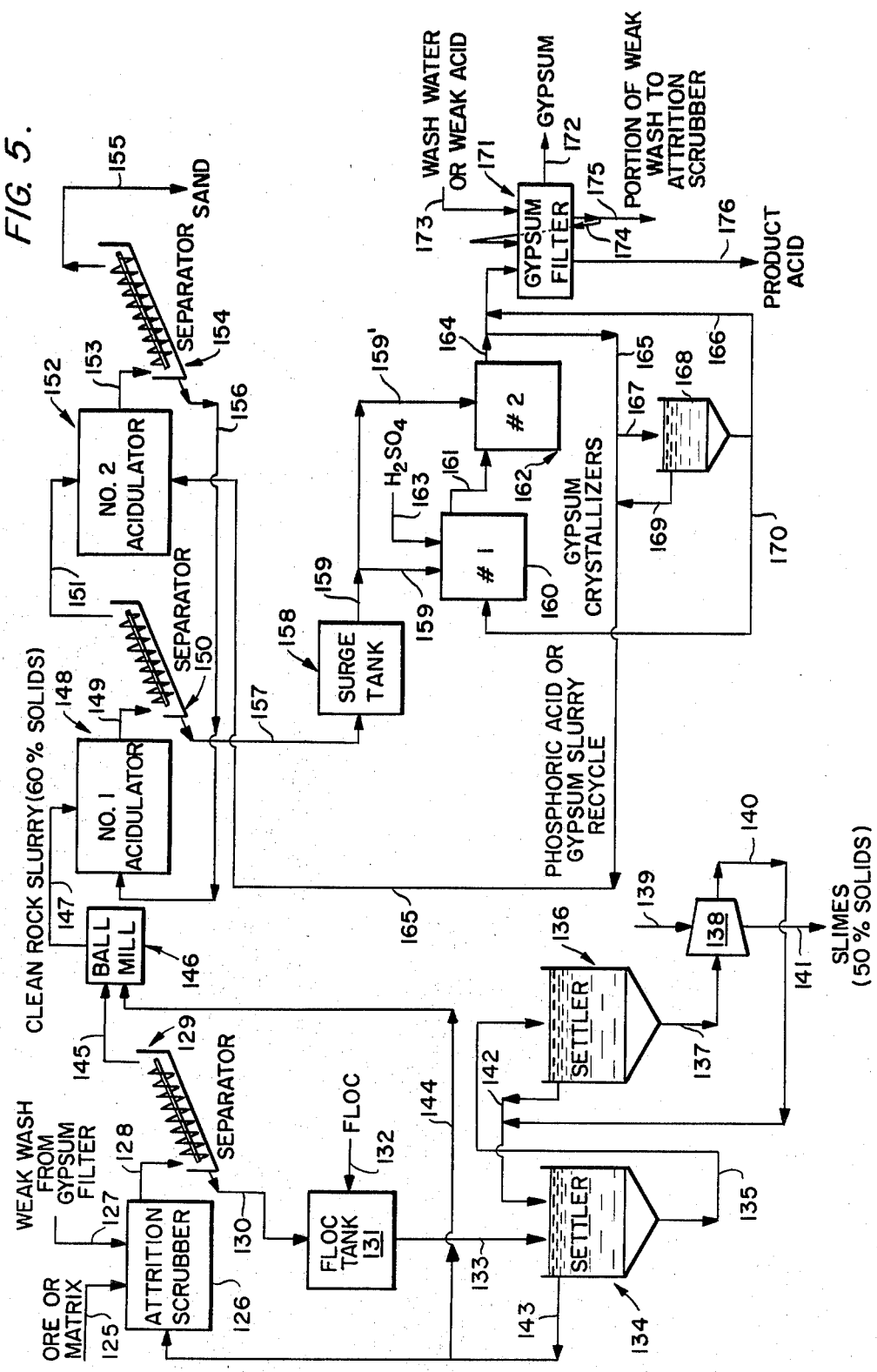
FIG. 5 is a flowsheet illustrating a specific embodiment of the invention showing a specific combination of the desliming circuit and acidulation circuit for the production of wet process phosphoric acid from matrix.

FIG. 5 describes a most preferred embodiment of the present invention wherein phosphate ore, e.g. matrix, or other very low grade phosphate containing material is processed to recover marketable phosphoric acid and also processed so as to recover most of the $P_2O_5$ values contained in the initial ore. Referring now to FIG. 5, it will be seen that the starting ore or matrix is introduced via line 125 into an attrition scrubber 126 where it is reacted with weak wash water containing $P_2O_5$ values from line 127 from the gypsum filter from a subsequent point in the process or from the gypsum pond. Also introduced into the scrubber is recycle weak phosphoric acid in line 143 recovered from the slime processing step. The mixture is reacted in the attrition scrubber 126 to effect desliming of the ore or matrix at ambient temperatures and good mixing. Thereafter the resulting mixture is transferred by line 128 to a suitable separator 129, and a slime suspension or emulsion is separated from the rock residue by line 130. The ore residue is transferred by line 145 to ball mill 146 or similar device where it is mixed with additional recycle phosphoric acid from line 144 for wet grinding to produce a deslimed rock slurry having a solids content in the range of about 40–70%.

In the meantime, the slime suspension in line 130 is transferred to a flocculation tank 131 and a conventional flocculant is added by line 132 to assist in flocculation of the slimes in the slurry. The resulting mixture is then transferred by line 133 to settler 134 for slime separation. In practice, a series of settlers is employed with this flowsheet showing two settlers in series. In this operation the mixture is continuously removed from settler 134 by line 135 and introduced into settler 136 with a continuous reverse flow being perfected through line 142. The bottoms from the settler 136 are removed to separator 138 and the slimes are removed at 141. The slime filter cake is washed with wash water from 139 which originates from the gypsum filter or pond. The resulting filtrate is removed by line 140 and recycled to the first settler by line 142.

In the meantime, the overflow from settler 134 is removed by line 143 and recycled to the attrition scrubber 126 for treatment of additional crude ore. A portion of this overflow may be removed by line 144 and taken to ball mill 146. Thus, by this system the crude ore or matrix is deslimed and the $P_2O_5$ valuable components are recovered from the resulting slime emulsion. It should be noted that the slimes recovered at line 141 will contain a small proportion of $P_2O_5$ content and may be processed as described herein to recover those values as normal superphosphate.

The clean rock slurry in line 147 is then subjected to acidulation by reaction with recycle phosphoric acid in No. 1 acidulator 148, the phosphoric acid solution having the concentration discussed for FIGS. 2, 3, and 4, and being introduced by line 156 from a later step in the process. The resulting acidulated slurry is then removed by 149 and passed through a separator 150 to separate unacidulated rock and other solids from the solution. The monocalcium phosphate/phosphoric acid solution containing a small amount of fine gypsum crystals, are removed by line 157 to surge or storage tank 158. From surge tank 158 the acidulated mixture is removed by line 159, split into two streams, 159 and 159′, and introduced into No. 1 and No. 2 gypsum crystallizers 160 and 162. Sulfuric acid is added to the No. 1 crystallizer by 163 and the mixture from the No. 1 acidulator is continuously removed to No. 2 acidulator by line 161. The conditions in the No. 1 and 2 acidulators are generally the same as described for FIGS. 2, 3, and 4. The split of the stream in lines 159 and 159′ is carried out as described for FIG. 2, to insure a proper content of $SO_3$ for good gypsum crystal growth.

The resulting slurry is removed by line 164 and a portion is recycled by line 165 to the No. 2 acidulation tank 152 for additional acidulation of rock. The other portion is passed to gypsum filter 171 where gypsum is removed at 172. The gypsum filter cake is washed with wash water or weak phosphoric acid from line 173 with a portion of the wash water being recycled through the filter by 174 and the other portion being removed by line 175 and passed to the attrition scrubber and introduced via line 127 for additional desliming. The product phosphoric acid is removed and recovered at line 176.

In an alternative embodiment, at least a portion of the gypsum slurry recycle in line 165 may be processed as described for FIGS. 2, 3, and 4. Thus, the slurry is removed at 167 and passed to settler 168. The overflow phosphoric acid solution is removed at 169 and recycled to line 165. The underflow concentrated gypsum slurry is divided into two portions, one portion being recycled to the No. 1 crystallizer 160 and the other portion being recycled via line 166 to the gypsum filter 171 for gypsum and phosphoric acid recovery as described above.

In the meantime, the solids removed from the solids separator in line 151 are passed to No. 2 acidulator 152 to continue the acidulation reaction. The acidulated slurry is then removed by line 153 to an additional separator 154. The sands and other insolubles are then removed at 155. The sands can be washed with water or a dilute mineral acid such as with dilute sulfuric acid to remove any unacidulated rock and the wash solution returned to crystallizer No. 1. The recovered acidulated mixture is recycled by line 156 to the No. 1 acidulator. This insures complete acidulation of the crude ore or matrix prior to introduction into the gypsum crystallizer.

It will be seen, therefore, that FIG. 5 provides a process by which crude phosphate ore or matrix can be processed to recover substantially all of the $P_2O_5$ values in operation of a phosphoric acid acidulation plant to produce marketable phosphoric acid from ore or matrix.

A variation on the invention of FIG. 5 which could be employed in the present invention would involve recovery of any finely divided solids from the surge tank and recycling those solids to the attrition scrubber for recovery in the desliming circuit. This could be accomplished simply by filtering the solids as they leave the surge tank and recycling the liquids back to the attrition scrubber and continuing the remainder of the solution to the crystallizers.

In a further embodiment, when a portion or stream of monocalcium phosphate-phosphoric acid solution is withdrawn, the solution or solid MCP recovered therefrom may be reacted with potassium sulfate, potassium bisulfate or mixtures thereof to product $KH_2PO_4/H_3PO_4$ solutions and gypsum from which $KH_2PO_4$ may be recovered as a fertilizer grade material by precipitation or extraction with an organic solvent as taught in U.S. Pat. No. 3,718,453. This reaction may be carried out by various procedures. In one embodiment, the solution of monocalcium phosphate in phosphoric acid may be treated as by reaction of a portion of the stream with $KHSO_4$ and/or $K_2SO_4$, to produce potassium phosphate such as $KH_2PO_4$, which is a valuable fertilizer product. A portion may also be reacted with sulfuric acid to produce phosphoric acid for recycle to serve as the phorphoric acid reactant in the acidulation reactor. The reaction with $KHSO_4$ and/or $K_2SO_4$ is conducted at 40°–70° C. with good agitation. Reaction with $K_2SO_4$ forms $KH_2PO_4$ and reaction with $KHSO_4$ forms a mixture of $KH_2PO_4$ and $H_3PO_4$, both of which are valuable products. If monocalcium phosphate is recovered as a solid, it may be converted to other useful products, especially fertilizer products. Thus, the monocalcium phosphate may react with potassium sulfate or potassium hydrogen sulfate to form $KH_2PO_4$ as illustrated by the following equations:

$$8Ca(H_2PO_4)_2 + 8K_2SO_4 \rightarrow 16KH_2PO_4 + 8CaSO_4 \cdot 2H_2O \tag{a}$$

$$8Ca(H_2PO_4)_2 + 8KHSO_4 \rightarrow 8KH_2PO_4 + 8H_3PO_4 + 8CaSO_4 \cdot 2H_2O \tag{b}$$

As will be understood, therefore, the process of the present invention provides a number of alternatives by which phosphate rock and particularly low grade phosphate rock such as rock matrix may be deslimed and then acidulated with phosphoric acid to produce phosphoric acid, gypsum and monocalcium phosphate, or solutions of monocalcium phosphate in phosphoric acid. A particular feature of the invention is that low grade rock may be employed in the process by reason of the desliming features. A further important aspect of the invention is that there is decreased fluoride evolution from the system, as compared with conventional systems, since high temperature acidulation of the phosphate rock with strong acid is not necessary. The fluorides originally contained in the rock will be generally distributed throughout the system with a portion removed with the slimes, a small portion found in the product acid and a portion in the gypsum. In the event that there is some fluoride evolution from any of the reactors, that amount is so small as to be easily handled by absorbers, scrubbers and the like by means known to the art.

The following examples are presented to illustrate the invention but it is not be considered as limited thereto. In the examples and throughout the application, parts are by weight unless otherwise indicated.

EXAMPLE 1

In this example, the process of FIG. 2 was practiced in which deslimed rock was acidulated. 5.9 Kg/hr. of deslimed rock was fed into an acidulator together with recycle phosphoric acid. Conditions in the acidulator comprise a temperature of 80° C., a residence time of 4 hours, and the recycle acid had a concentration of 28–30 weight percent. The recycle ratio of $P_2O_5$ in the recycle acid to $P_2O_5$ in the rock was about 15.

The resulting acidulated slurry was then passed through a set of screw classifiers by which 1.54 Kg/hr. of sand was removed from the monocalcium phosphate-phosphoric acid solution. This monocalcium phosphate-phosphoric acid solution was then split into two streams and fed into two gypsum crystallizers in series. Sulfuric acid was fed into the No. 1 crystallizer. The ratio of monocalcium phosphate feed rate between the two crystallizers was such that the $SO_3$ concentration in crystallizer No. 1 solution was 2.5–3.5 and the CaO equivalent was greater than the $SO_3$ equivalent in crystallizer No. 2. The residence time in each crystallizer was 3 hours and the temperature in each crystallizer was 65° C.

From the gypsum crystallizers the resulting slurry was passed through a gypsum filter from which 11.92 Kg/hr. of gypsum was recovered and phosphoric acid removed as filtrate. A portion of the phosphoric acid, 3.90 Kg/hr., was recovered as product and a large portion, 95.5 Kg/hr., was recycled to the acidulator vessels for additional acidulation.

Table I below gives the analyses of the deslimed rock, product acid, sand, and gypsum.

TABLE I

| | Weight Percent | | | |
|---|---|---|---|---|
| | Deslimed Rock | Produced Acid | Gypsum | Sand |
| $Al_2O_3$ | 0.671 | 0.572 | 0.083 | 0.24 |
| CaO | 32.65 | 0.845 | 18.49 | 16.98 |
| F | 2.71 | 1.36 | 0.25 | 1.64 |
| $Fe_2O_3$ | 0.425 | 0.654 | 0.041 | 0.16 |
| MgO | 0.794 | 0.899 | 0.048 | 0.113 |
| $SO_3$ | 0.31 | 0.872 | 25.12 | 1.19 |
| $P_2O_5$ | 26.42 | 30.4 | 2.02 | 14.08 |
| C.I. $P_2O_5$ | 21.40 | — | 0.0 | 8.40 |
| W.S. $P_2O_5$ | 3.15 | — | 1.70 | 3.35 |
| $SiO_2$ | 11.80 | 0.626 | 1.34 | 46.22 |
| Moisture | 21.7 | — | 46.4 | 20.8 |

EXAMPLE 2

To illustrate the concepts embodied in the desliming circuit, a laboratory scale experiment was conducted. A weak acid solution containing 3 wt.% $P_2O_5$ was mixed at high speed with a sample of Florida phosphate matrix at a ratio of 10 parts acid to 1 part matrix. The resulting slurry was allowed to settle for a short period of time. The clay containing slimes in the overflow were decanted and flocculated with a nonionic polyacrylamide. The concentrated slime slurry was vacuum filtered and solids washed with distilled $H_2O$. The underflow material contained mostly unreacted deslimed phosphate rock. This material was mixed with a 3 wt.% $P_2O_5$ containing solution at approximately a 1 to 1 ratio. The resulting mixture was ground in a ceramic ball mill. The grinding media occupied approximately 50% of the usable volume of the vessel. The final slurry was vacuum filtered and the solids washed with distilled $H_2O$. All solids and filtrates were analyzed for $P_2O_5$ content. Table II illustrates the salient features of the experiment.

TABLE II

| | Total $P_2O_5$ (gms) | C.I. $P_2O_5$ (gms) | C.S. $P_2O_5$ (gms) | Wt. Comp. (gms) |
|---|---|---|---|---|
| INPUT | | | | |
| Matrix | 12.17 | 10.30 | 1.87 | 100.52 |
| Weak Acid | 33.01 | — | 33.01 | 1325.42 |
| Total INPUT | 45.18 | 10.30 | 34.88 | 1425.94 |
| OUTPUT | | | | |
| Dry Slimes | 1.956 | 0.951 | 0.916 | 25.37 |
| Dry Clean Rock | 10.337 | 6.828 | 3.43 | 65.34 |
| Clean Rock and Slime Filtrates | 29.12 | — | 29.12 | 1242.57 |
| Total OUTPUT | 41.41 | 7.78 | 33.47 | 1333.28 |
| % $P_2O_5$ in Dry Slimes (based on component $P_2O_5$ in Input Matrix) | 16.07% | 9.23% | 48.98% | |
| % $P_2O_5$ in Dry Slimes (based on Total $P_2O_5$ in Input Matrix) | 16.07% | 7.81% | 7.53% | |

EXAMPLE 3

This example illustrates the conversion of the slimes into useful products. Wet slimes are removed from matrix which contain about 18% $P_2O_5$ (Tot), 9% C.I. $P_2O_5$, and 6% W.S. $P_2O_5$. The citrate insoluble $P_2O_5$ is recovered by converting the slime into normal superphosphate (NSP) or triple superphosphate (TSP). Alternatively, the slimes can be further processed to recover most of the $P_2O_5$ as wet acid.

In this example, a 100 gram sample of recovered slimes were treated with about 50 grams of 98% sulfuric acid at 110° C. overnight to produce a sample of normal superphosphate. The analyses of the normal superphosphate is given below:

| Component | Wt. % |
|---|---|
| $Al_2O_3$ | 1.41 |
| CaO | 16.93 |
| $Fe_2O_3$ | 0.56 |
| MgO | 0.25 |
| $P_2O_5$ (Total) | 19.48 |
| $P_2O_5$ (Water Sol.) | 19.48 |
| $P_2O_5$ (C.I.) | 0.03 |

-continued

| Component | Wt. % |
|---|---|
| F | Nil |

Samples of triple superphosphate are also prepared from slimes. One portion of slime is treated with wet acid (46% $P_2O_5$) (A), and a second portion is treated with wet acid and gypsum (B). The samples are heated at 110° C. overnight. The results are as follows.

TABLE III

|  | Sample A | Sample B |
|---|---|---|
| Wt. Wet Slimes (47% moisture), gms | 100 | 100 |
| Wt. Wet Acid (46% $P_2O_5$), gms | 41 | 41 |
| Wt. Gypsum[1], gms | 0 | 10 |
| Analysis (Wt. %) | | |
| $Al_2O_3$ | 2.14 | 1.91 |
| CaO | 12.12 | 14.66 |
| $Fe_2O_3$ | 1.31 | 1.06 |
| MgO | 0.44 | 0.42 |
| $P_2O_5$ (Total) | 55.04 | 48.94 |
| $P_2O_5$ (Water Soluble) | 35.63 | 36.25 |
| $P_2O_5$ (C.I.) | 0.06 | 0.03 |
| F | 0.32 | 0.28 |
| $SiO_2$ | 9.68 | 8.61 |

[1]The gypsum contained about 7% water soluble $P_2O_5$.

For the sample that contained gypsum, the ratio of water soluble $P_2O_5$ to total $P_2O_5$ was 0.74; whereas, in the sample with no gypsum, the ratio was 0.65.

EXAMPLE 4

In this example, the citrate insoluble $P_2O_5$ in the slimes was acidulated by additional processing of the slimes.

In this series of laboratory tests, filtered slime was reslurried with monocalcium phosphate solution. In some of the tests, wet acid (35% $P_2O_5$) was added, and in others, wet acid and gypsum were added. The mixtures were stirred at 40° C. or 80° C. for one or three hours. At the end of the stirring period, the mixtures were flocculated with Magnifloc 905N, and the solids were filtered, washed, and dried. The results are given in Table IV.

TABLE IV
REACTION OF FILTERED SLIMES WITH MONOCAL SOLUTION AND WET ACID

|  | Run No. A | Run No. B | Run No. C |
|---|---|---|---|
| Wt. of slimes (gms) | 20 | 20 | 20 |
| Wt. of 17% Monocal Solution | 200 | 200 | 200 |
| Wt. of 35% Wet Acid | 0 | 0 | 200 |
| Reaction Time, Hrs. | 1 | 3 | 1 |
| Temp., °C. | 80 | 80 | 80 |
| % of $P_2O_5$ Extracted from Slime | 26 | 24 | 97 |
| % of $Al_2O_3$ Extracted from Slime | 59 | 67 | 93 |

At 80° C. with no additional wet acid, only about 25% of the $P_2O_5$ was extracted at 1 or 3 hours, whereas with additional wet acid, essentially all of the $P_2O_5$ was extracted at 1 hour. Also, the $Al_2O_3$ (clay component) is acidulated with the $P_2O_5$ (rock).

EXAMPLE 5

The fluoride level in the product acid or recycle acid stream can be reduced by the addition of a potassium, sodium or ammonium salt. In this example, potassium monobasic phosphate ($KH_2PO_4$) was used to reduce the fluoride level of the acid. $KH_2PO_4$ removes fluoride from phosphoric acid according to the equation below to precipitate insoluble $K_2SiF_6$.

$$6HF + SiO_2 + 2KH_2PO_4 = K_2SiF_6 \downarrow + 2H_3PO_4 + 2H_2O$$

Twenty-six grams of $KH_2PO_4$ was added to 1,000 grams of wet acid that contained 1% F. The mixture was heated at 60° C. and stirred for 3 hours. At the end of this period, the solids were separated from the mixture, washed and dried. Analysis of the filtrate and solid indicated that about 65% of the fluoride was precipitated from the wet acid as $K_2SiF_6$. The resulting acid contained about 0.3% F and about 0.4% $K_2O$.

EXAMPLE 6

In this example, a process using equipment similar to that of FIG. 3 was practiced in which ground phosphate rock was reacted with weak recycle phosphoric acid using a volume of recycle acid solution representing about 8 parts solution by weight to 1 part of rock added with contact at a temperature of 40° C.. The resulting slime emulsion was separated from the deslimed rock in a screw classifier and the slime was removed.

The deslimed rock was then passed to a two-stage acidulator together with recycle phosphoric acid. Conditions in the acidulator comprise a temperature of 70° C., a residence time of 4 hours, the recycle acid had a concentration of 30 weight percent, and the recycle ratio of $P_2O_5$ in the recycle acid to $P_2O_5$ in the rock was 14.

The resulting acidulated slurry was then passed through a set of screw classifiers by which sand was removed from the monocalcium phosphate-phosphoric acid solution. This monocalcium phosphate-phosphoric acid solution was then split into two streams and fed into gypsum crystallizers and sulfuric acid was fed into the number 1 crystallizer. The ratio of monocalcium phosphate feed rate between the two crystallizers was such that the $SO_3$ in crystallizer No. 1 was 2.0 and the CaO equivalent was greater than the $SO_3$ equivalent in crystallizer No. 2. The residence time in each crystallizer was 3 hours and the temperature in each crystallizer was 65° C..

From the gypsum crystallizers the resulting slurry was passed through a gypsum filter from which the gypsum was recovered and phosphoric acid removed as filtrate. A portion of the phosphoric acid was recovered as product and a large portion was recycled to the acidulator vessels for additional acidulation.

The following Tables VI-A and VI-B set forth the results of these runs:

TABLE VI-A

| $P_2O_5$ BALANCE |  |
|---|---|
|  | Kg $P_2O_5$ |
| INPUT | |
| Phosphate Rock | 66.2 |
| From Trap No. 1 | 0.02 |
| Total | 66.22 Kg |
| ACCUMULATION | |
| Acidulators 1 and 2 | −7.0 |
| Crystallizers 1 and 2 | −1.7 |
| Product Surge Tank | 11.6 |
| Monocal Surge Tank | −19.5 |
| Weak Filtrate Receiver | 1.8 |
| Slime Slurry | −0.06 |
| Total | −14.96 Kg |

TABLE VI-A-continued

P₂O₅ BALANCE

| | Kg P₂O₅ |
|---|---|
| OUTPUT | |
| Product | 19.7 |
| Sand | 8.8 |
| Slimes | 12.4 |
| Gypsum | 30.3 |
| Spills and Misc. Test Samples | 5.3 |
| Total | 76.5 Kg |

P₂O₅ Material Balance = 93.1%

TABLE VI-B

P₂O₅ BALANCE

| | Kg P₂O₅ |
|---|---|
| INPUT | |
| Phosphate Rock | 205 |
| From Trap No. 1 | 0.02 |
| Total | 205.02 Kg |
| ACCUMULATION | |
| Tanks 2 and 3 | −3.5 |
| Crystallizers 1 and 2 | −14.8 |
| Product Surge Tank | 11.6 |
| Monocal Surge Tank | −17.2 |
| Weak Filtrate Receiver | 1.3 |
| Slime Slurry | 1.5 |
| Total | −21.1 Kg |
| OUTPUT | |
| Product | 34.5 |
| Sand | 16.0 |
| Slimes | 26.9 |
| Gypsum | 146 |
| Spills and Misc. Test Samples | 7.7 |
| Total | 231.1 Kg |

P₂O₅ Material Balance = 102%

EXAMPLE 7

In this example, the desliming circuit, the acidulation circuit and the gypsum crystallization circuit of FIG. 5 are combined in conducting a counter-current acidulation and wet grinding of phosphate matrix. Phosphate matrix containing 12.1% $P_2O_5$ is introduced at the rate of 1.0 Kg/hr. into an attrition scrubber together with recycle phosphoric acid solution containing 3% $P_2O_5$ from the slime emulsion settler at the rate of 900 Kg/hr. A portion of the weak water wash from the gypsum filter is also introduced into the attrition scrubber, the gypsum wash containing 2.02% $P_2O_5$ and 0.32% citrate soluble $P_2O_5$ and introduced at the rate of 0.77 Kg/hr. The residence time in the scrubber is 0.5 hour, after which the resulting mixture is passed through a screw classifier to effect a separation of the slime emulsion. The slime emulsion is removed to a flocculation tank and 10 parts per million of a commercial flocculant, Magnifloc 905N, are added. The resulting flocculated mixture is then removed to a series of settlers with the bottoms from the first settler being forwarded to the second settler with reverse recyle. The bottoms from the second settler are then subjected to separation for slime removal. The slimes recovered comprise a mixture of 50% solids containing 3.8% $P_2O_5$, 1.9% citrate insoluble and 1.8% citrate soluble. The slime solids are removed at the rate of 0.50 Kg/hr. A portion of the mixture is continuously recycled to the No. 1 settler, the slime solids are washed and the wash water recycled to the first settler. The overflow from the No. 1 settler is recycled to the attrition scrubber for additional reaction with phosphate ore.

A portion of the phosphoric acid overflow from the No. 1 settler is removed to a ball mill where it is mixed with the clean rock slurry recovered from the screw classifier. This mixture, which contains 60% solids of 9.49% $P_2O_5$, is passed to the No. 1 acidulator and reacted with a recycle acidulation mixture comprising gypsum slurry and containing phosphoric acid, gypsum and water. The residence time in this No. 1 acidulator is two hours at 65° C.

The slurry from the No. 1 acidulator is then passed to a screw classifier which makes a separation between the heavier non-acidulated materials and the solution. The solids exit from the top of the screw classifier and go to the No. 2 acidulator for additional acidulation at 65° C. for an additional residence time of two hours. The mixture from the second acidulator is then passed to a second screw classifier which removes 0.18 Kg/hr. of sand which contains 20% moisture. The liquids from the second screw classifier are recycled back to the No. 1 acidulator to return to the system.

In the meantime, the solution from the first screw classifier is passed to a storage or surge tank with the overflow then passed to the gypsum crystallizers. The stream from the surge tank is split so that one portion goes to the No. 1 crystallizer and the second portion goes to the No. 2 crystallizer. Both crystallizers are operated at 65° C. with retention times of 3 hours. Sulfuric acid is added only to the No. 1 crystallizer and the reacting slurry is continuously transferred from the No. 1 crystallizer to the No. 2 crystallizer. The sulfuric acid is added to maintain a free $SO_3$ rate of 1.5–4 wt.% therein.

The gypsum slurry from the No. 2 crystallizer is removed, split into two streams and a portion recycled back to the No. 1 acidulator to provide gypsum solids on which to aid in gypsum crystal growth and also to provide phosphoric acid for the acidulation. The remainder of the gypsum slurry is passed to a gypsum filter where it is filtered. The gypsum filter cake is washed with wash water with a portion of the weak wash being removed and recycled to the attrition scrubber as described above.

The product phosphoric acid is removed as a separate stream from the gypsum filter at the rate of 0.29 Kg/hr. which contains 30% $P_2O_5$ and is marketable grade phosphoric acid.

EXAMPLE 8

Using an apparatus scheme similar to that of FIG. 5 which involved two-stage acidulation and two-stage crystallization, but without a desliming circuit, a low grade, high silica rock having a BPL content of 55 to 58, was processed. In the system, the $P_2O_5$ concentration of the recycle phosphoric acid was 29%, the total $SO_3$ concentration in the No. 1 crystallizer solution was 2.75%, and the operation was isothermal. Both acidulation and crystallization were conducted at 65° C. Positive displacement pumps were used to control the recycle acid and monocalcium phosphate streams.

This operation was a pilot plant operation. The conversion of $P_2O_5$ was 98.5 to 99.8 weight percent.

EXAMPLE 9

This example was to demonstrate the two-stage acidulation reaction without the crystallization step, but using very low quality phosphate ore. The rock was an Agrico rock or ore having a BPL content of 25 which was sold as flotation feed. The process involved a single pass, two-stage acidulation. The material balance is set forth in following Table IX and the material balance for P₂O₅ is set forth in the following Table X.

TABLE VII
MATERIAL BALANCE (P₂O₅)

| | Wt. P₂O₅ (Kg) |
|---|---|
| INPUT | |
| Phosphate Rock | 10.8 |
| Phosphoric Acid | 169.9 |
| | 180.7 |
| OUTPUT | |
| Monocal Solution | 130.5 |
| Sand from Screw | 0.33 |
| Liquid Remaining in Tank #2 | 19.2 |
| Liquid Remaining in Tank #3 | 18.1 |
| Solids Remaining in Tank #2 | 0.86 |
| Solids Remaining in Tank #3 | 0.69 |
| | 169.7 |

P₂O₅ Balance = 93.9%
Conversion = 100%
Recovery = 95.5%

TABLE VIII
MATERIAL BALANCE (WEIGHT)

| | WEIGHT (Kg) |
|---|---|
| INPUT | |
| Phosphate Rock | 96.3 |
| Phosphoric Acid | 591.6 |
| Defoamer Solution | 7.7 |
| Sand Screw Wash | 24.5 |
| Total | 720.1 |
| OUTPUT | |
| Monocal Solution | 474.0 |
| Sand From Screw | 45.2 |
| Liquid Remaining in Tank #2 | 65.9 |
| Liquid Remaining in Tank #3 | 63.7 |
| Solids Remaining in Tank #2 | 11.8 |
| Solids Remaining in Tank #3 | 9.8 |
| Total | 670.4 |

Weight Balance = 93.1%

The invention has been described herein with reference to certain preferred embodiments. However, as obvious variations thereon will become apparent to those skilled in the art from this specification, such variations are considered to be within the scope of the present invention.

What is claimed is:

1. A process for the production of phosphoric acid from deslimed phosphate ore which comprises the steps of:
   (a) contacting said deslimed phosphate ore with a sufficient amount of a phosphoric acid solution in an acidulator to solubilize said phosphate ore and convert at least a portion of the calcium contained in the ore so as to form a solution of monocalcium phosphate in phosphoric acid containing sand solids and residual slimes;
   (b) passing said solution through a separator to remove the sand solids from the solution of monocalcium phosphate in phosphoric acid and dividing the solution into two portions, said solution still containing residual slimes;
   (c) contacting one of said portions which still contains residual slimes, with sufficient sulfuric acid in a first crystallizer to convert all the incoming calcium equivalent to the calcium in the ore to calcium sulfate, and wherein the sulfuric acid is added to the said portion at a sufficient rate to maintain a total SO₃ content in the first crystallizer solution of about 1.5 to 4.0 wt.% and form a mixture containing phosphoric acid and calcium sulfate;
   (d) reacting the mixture from the first crystallizer with the remaining portion of the said solution which still contains residual slimes, in a second crystallizer, there being sufficient calcium in the said remaining portion to neutralize the SO₃ content contained in the mixture from the first crystallizer and form a slurry containing calcium sulfate and phosphoric acid;
   (e) removing the resulting slurry, passing to a separator and separating the calcium sulfate solids from the phosphoric acid solution; and
   (g) recovering the phosphoric acid.

2. A process according to claim 1, wherein the deslimed phosphate ore is pebble phosphate rock.

3. A process according to claim 1 wherein said deslimed phosphate ore is flotation feed phosphate rock.

4. A process according to claim 1 wherein said deslimed phosphate ore has a BPL content of about 10-40%.

5. A process according to claim 1 wherein the deslimed phosphate ore is solubilized with recycle phosphoric acid solution containing about 25-45 wt. % P₂O₅ with the solubilization conducted at a temperature of about 40°-90° C., a residence time of about ½ to 8 hours, and a recycle ratio of P₂O₅ in the recycle acid to P₂O₅ in the rock of about 7:1 to 18:1 said recycle phosphoric acid being a portion of the phosphoric acid product or a portion of the slurry from the second crystallizer which contains phosphoric acid and calcium sulfate.

6. A process according to claim 1 wherein the solubilization of the deslimed phosphate ore is carried out in a countercurrent manner.

7. A process according to claim 1 wherein the monocalcium phosphate solution is reacted with the sulfuric acid in the crystallizers at temperatures of about 50°-80° C. with contact times of about 1-12 hours.

8. A process according to claim 1 wherein a stream of monocalcium phosphate in phosphoric acid is removed from the system and the monocalcium phosphate is reacted with a member selected from the group consisting of (a) potassium sulfate, (b) potassium hydrogen sulfate, and (c) mixtures thereof, to produce KH₂PO₄, and KH₂PO₄/H₃PO₄ mixtures, and gypsum, and (d) sulfuric acid, to produce a quality grade phosphoric acid and gypsum.

9. A process according to claim 5 wherein a stream of monocalcium phosphate in phosphoric acid is removed from the system and the monocalcium phosphate is reacted with a member selected from the group consisting of (a) potassium sulfate, (b) potassium hydrogen sulfate, and (c) mixtures thereof, to produce KH₂PO₄, and KH₂PO₄/H₃PO₄ mixtures, and gypsum, and (d) sulfuric acid, to produce a quality grade phosphoric acid and gypsum.

10. A process for the production of phosphoric acid from deslimed phosphate ore which comprises the steps of:
   (a) contacting said deslimed phosphate ore with a sufficient amount of a phosphoric acid solution in an acidulator to solubilize said phosphate ore and convert at least a portion of the calcium contained in the rock so as to form a solution of monocalcium phosphate in phosphoric acid containing sand solids and residual slimes;

(b) passing said solution through a separator to remove the sand solids from the solution of monocalcium phosphate in phosphoric acid and dividing the solution into two portions, said solution still containing residual slimes;

(c) contacting one of said portions which still contains residual slimes with sufficient sulfuric acid in a first crystallizer to convert all the incoming calcium equivalent to the calcium in the ore to calcium sulfate, and wherein the sulfuric acid is added at a sufficient rate to maintain a total $SO_3$ content in the first crystallizer solution of about 1.5 to 4.0 wt.% and form a mixture containing phosphoric acid and calcium sulfate;

(d) reacting the mixture from the first crystallizer with the remaining portion of the said solution which still contains residual slimes, in a second crystallizer, there being sufficient calcium in the said remaining portion to neutralize the $SO_3$ content contained in the mixture from the first crystallizer and form a slurry of calcium sulfate and phosphoric acid;

(e) removing the resulting slurry to a settler and separating into a phosphoric acid solution overflow and a calcium sulfate slurry underflow;

(f) recycling at least a portion of the calcium sulfate slurry underflow to the said first crystallizer; and the remaining portion of the underflow to a separator;

(g) passing the phosphoric acid solution overflow to the first acidulator; and (h) separating said remaining portion of the underflow to recover calcium sulfate and phosphoric acid product.

11. A process according to claim 10, wherein the deslimed phosphate ore is pebble phosphate rock.

12. A process according to claim 10 wherein said deslimed phosphate ore is flotation feed phosphate rock.

13. A process according to claim 10 wherein said deslimed phosphate ore has a BPL content of about 10–40%.

14. A process according to claim 10 wherein the deslimed phosphate ore is solubilized with recycle phosphoric acid solution overflow containing about 25–45 wt. % $P_2O_5$ with the solubilization conducted at a temperature of about 40°–90° C., a residence time of about ½ to 8 hours, and a recycle ratio of $P_2O_5$ in the recycle acid to $P_2O_5$ in the rock of about 7:1 to 18:1.

15. A process according to claim 10 wherein the solubilization of the deslimed phosphate ore is carried out in a countercurrent manner.

16. A process according to claim 10 wherein the monocalcium phosphate solution is reacted with the sulfuric acid in the crystallizers at temperatures of about 50°–80° C. with contact times of about 1–12 hours.

17. A process according to claim 10 wherein a stream of monocalcium phosphate in phosphoric acid is removed from the system and the monocalcium phosphate is reacted with a member selected from the group consisting of (a) potassium sulfate, (b) potassium hydrogen sulfate, and (c) mixtures thereof, to produce $KH_2PO_4$, and $KH_2PO_4/H_3PO_4$ mixtures, and gypsum, and (d) sulfuric acid, to produce a quality grade phosphoric acid and gypsum.

18. A process according to claim 14 wherein a stream of monocalcium phosphate in phosphoric acid is removed from the system and the monocalcium phosphate is reacted with a member selected from the group consisting of (a) potassium sulfate, (b) potassium hydrogen sulfate, and (c) mixtures thereof, to produce $KH_2PO_4$, and $KH_2PO_4/H_3PO_4$ mixtures, and gypsum, and (d) sulfuric acid, to produce a quality grade phosphoric acid and gypsum.

19. A process for the production of phosphoric acid from phosphate ore which comprises the steps of:
(a) contacting phosphate ore in a deslimer with a weak phosphoric acid solution to form a suspension of at least a portion of the slimes contained in the ore so that the slimes can be separated from the ore;

(b) separating the slimes as a suspension in the weak phosphoric acid to provide a deslimed phosphate ore;

(c) containing said deslimed phosphate ore with a sufficient amount of a phosphoric acid solution to solubilize said phosphate ore so as to convert at least a portion of the calcium contained in the ore and form a solution of monocalcium phosphate in phosphoric acid containing sand solids and residual slimes;

(d) passing said solution through a separator to remove the sand solids from the solution of monocalcium phosphate in phosphoric acid and dividing the solution into two portions, said solution still containing residual slimes;

(e) contacting one of said portions which still contains residual slimes with sufficient sulfuric acid to convert all the incoming calcium equivalent to the calcium in the ore to calcium sulfate, and wherein the sulfuric acid is added to the said portion at a sufficient rate to maintain a total $SO_3$ content in the first crystallizer solution of about 1.5 to 4.0 wt.% and form a mixture containing phosphoric acid and calcium sulfate;

(f) reacting the mixture from the first crystallizer with the remaining portion of the said solution which still contains residual slimes, in a second crystallizer, there being sufficient calcium in the said remaining portion to neutralize the $SO_3$ content contained in the mixture from the first crystallizer and form a slurry of calcium sulfate and phosphoric acid;

(g) removing the resulting slurry from the second crystallizer to a separator and separating solid calcium sulfate from a phosphoric acid solution; and (h) recovering at least a portion of the phosphoric acid solution.

20. A process according to claim 19 wherein the phosphate ore is low grade phosphate ore having a BPL content of 10 to 40%.

21. A process according to claim 19 wherein the phosphate ore is phosphate matrix.

22. A process according to claim 19 wherein the slimes are separated from the deslimed ore, the slimes are removed and the process liquids are recycled to the desliming stage.

23. A process according to claim 19 wherein the phosphate ore is deslimed by contact with a solution of phosphoric acid having a $P_2O_5$ content of about 1–20 wt. %.

24. A process according to claim 19 wherein the phosphate ore is deslimed by contact with a weak solution of phosphoric acid in an amount of about 2–10 parts of phosphoric acid solution per part of phosphate ore.

25. A process according to claim 19 wherein the calcium sulfate in the separator is washed with water and the wash water is recycled as said weak solution of phosphoric acid.

26. A process according to claim 19 wherein a portion of the slurry from the second crystallizer is recycled to the acidulator and the remainder is passed to said separator for phosphoric acid recovery, the amount of slurry being passed to said separator being sufficient to remove an amount of $P_2O_5$ in the phosphoric acid product which is equivalent to the $P_2O_5$ content of the entering phosphate ore.

27. A process according to claim 19 wherein, prior to passing to said separator, said slurry is passed to a settler and separated into a phosphoric acid solution overflow and a calcium sulfate slurry underflow, at least a portion of the slurry underflow is recycled to the said first crystallizer, and the remaining portion of the underflow is recycled to the separator, the phosphoric acid solution overflow is passed to the first acidulator, and the remaining portion is passed to the separator to recover calcium sulfate and phosphoric acid product.

28. A process according to claim 19 wherein the deslimed phosphate ore is solubilized with recycle phosphoric acid solution containing about 25-45 wt. % $P_2O_5$ with the solubilization conducted at a temperature of about 40°-90° C., a residence time of about $\frac{1}{2}$ to 8 hours, and a recycle ratio of $P_2O_5$ in the recycle acid to $P_2O_5$ in the rock of about 7:1 to 18:1.

29. A process according to claim 19 wherein the solubilization of the deslimed phosphate ore is carried out in a countercurrent manner.

30. A process according to claim 19 wherein a stream of monocalcium phosphate in phosphoric acid is removed from the system and the monocalcium phosphate is reacted with a member selected from the group consisting of (a) potassium sulfate, (b) potassium hydrogen sulfate, and (c) mixtures thereof, to produce $KH_2PO_4$, and $KH_2PO_4/H_3PO_4$ mixtures, and gypsum, and (d) sulfuric acid, to produce a quality grade phosphoric acid and gypsum.

31. A process according to claim 28 wherein a stream of monocalcium phosphate in phosphoric acid is removed from the system and the monocalcium phosphate is reacted with a member selected from the group consisting of (a) potassium sulfate, (b) potassium hydrogen sulfate, and (c) mixtures thereof, to produce $KH_2PO_4$, and $KH_2PO_4/H_3PO_4$ mixtures, and gypsum, and (d) sulfuric acid, to produce a quality grade phosphoric acid and gypsum.

32. A process for the production of phosphoric acid from phosphate ore which comprises the steps of:
  (a) contacting said phosphate ore in a deslimer with a weak phosphoric acid solution to form a suspension of at least a portion of the slimes contained in the ore so that the slimes can be separated from the ore;
  (b) separating the slime suspension to provide a deslimed phosphate ore;
  (c) contacting said deslimed phosphate ore with a sufficient amount of a recycle phosphoric acid solution in at least one acidulator to solubilize said phosphate ore so as to convert at least a portion of the calcium contained in the ore and form a solution of monocalcium phosphate in phosphoric acid containing sand solids and residual slimes;
  (d) passing said monocalcium phosphate in phosphoric acid solution through a separator to remove the sand solids from the solution of monocalcium phosphate in phosphoric acid, said solution still containing residual slimes;
  (e) dividing said solution into two portions, each of said portions still containing residual slimes;
  (f) contacting one of said portions with sufficient sulfuric acid in a first crystallizer to convert all the incoming calcium equivalent to the calcium in the ore to calcium sulfate, and wherein the sulfuric acid is added to the said portion at a sufficient rate to maintain a total $SO_3$ content in the first gypsum crystallizer solution of about 1.5 to 4.0 wt.% and form a mixture containing phosphoric acid and calcium sulfate;
  (g) reacting the mixture from the first crystallizer with the remaining portion of the said solution in a second crystallizer, there being sufficient calcium in the said remaining portion to neutralize the $SO_3$ content contained in the mixture from the first crystallizer and form a calcium sulfate and phosphoric acid slurry;
  (h) removing a portion of the slurry from the second crystallizer and recycling to the at least one acidulator;
  (i) passing the remainder of the slurry to a separator and separating the calcium sulfate from the phosphoric acid, the amount of calcium sulfate slurry being passed to said gypsum separator being sufficient to remove an amount of $P_2O_5$ in the phosphoric acid product which is equivalent to the $P_2O_5$ content of the entering phosphate ore;
  (j) washing the calcium sulfate solids with water and recycling the wash water as a weak phosphoric acid solution to the deslimer to deslime additional phosphate ore;
  (k) recycling a portion of the phosphoric acid from step (i) to said at least one acidulator to solubilize additional phosphate ore; and
  (l) recovering at least a portion of the phosphoric acid as product acid.

33. A process for the production of phosphoric acid from phosphate ore which comprises the steps of:
  (a) contacting phosphate ore in a deslimer with a weak phosphoric acid solution to form a suspension of at least a portion of the slimes contained in the ore so that the slimes can be separated from the ore;
  (b) separating the slime suspension to provide a deslimed phosphate ore;
  (c) contacting said deslimed phosphate ore with a sufficient amount of a recycle phosphoric acid solution in at least one acidulator to solubilize said phosphate ore so as to convert at least a portion of the calcium contained in the ore and form a solution of monocalcium phosphate in phosphoric acid containing sand solids and residual slimes;
  (d) passing said monocalcium phosphate in phosphoric acid solution through a separator to remove the sand solids from the solution of monocalcium phosphate in phosphoric acid, said solution still containing residual slimes;
  (e) dividing said solution into two portions, each of said portions still containing residual slimes;
  (f) contacting one of said portions with sufficient sulfuric acid in a first crystallizer to convert all the incoming calcium equivalent to the calcium in the ore to calcium sulfate, and wherein the sulfuric acid is added to the said portion at a sufficient rate to maintain a total $SO_3$ content in the first crystallizer solution of about 1.5 to 4.0 wt.% and form a mixture containing phosphoric acid and calcium sulfate;

(g) reacting the mixture from the first crystallizer with the remaining portion of the said solution in a second crystallizer, there being sufficient calcium in the said remaining portion to neutralize the $SO_3$ content contained in the mixture from the first crystallizer and form a phosphoric acid and calcium sulfate slurry;

(h) removing the slurry from the second crystallizer, passing to a settler, separating into a phosphoric acid solution overflow and a calcium sulfate slurry underflow, recycling at least a portion of the slurry underflow to the said first crystallizer, and recycling the remaining portion of the underflow to a separator, passing a portion of the overflow to the first acidulator, and passing the remaining portion of the overflow to the separator; and (i) removing calcium sulfate in the separator recovering product phosphoric acid.

34. A process according to claims 32 or 33 wherein the phosphate ore is phosphate matrix.

35. A process according to claims 32 or 33 wherein the weak phosphoric acid solution in step (a) has a $P_2O_5$ content of about 1–20 wt. %.

36. A process according to claims 32 or 33 wherein a flocculant is added to the slime suspension to assist in solids separation.

37. A process according to claims 32 or 33 wherein the phosphoric acid solution containing slimes which is separated from the deslimed phosphate rock is further acidulated by the addition of phosphoric acid.

38. A process according to claims 32 or 33 wherein the flocculated slimes are removed from the system and the slime filtrates are combined with recycle acid to effect acidulation of the deslimed phosphate ore.

39. A process according to claims 32 or 33 wherein the deslimed phosphate ore is solubilized with recycle phosphoric acid solution containing about 25–45 wt. % $P_2O_5$ with the solubilization conducted at a temperature of about 40°–90° C., a residence time of about $\frac{1}{2}$–8 hours, and a recycle ratio of $P_2O_5$ in the recycle acid to $P_2O_5$ in the rock of about 7:1 to 18:1.

40. A process according to claims 32 or 33 wherein the solubilization of the deslimed phosphate ore is carried out in a countercurrent manner.

41. A process according to claims 32 or 33 wherein the monocalcium phosphate-phosphoric acid solution is reacted with the sulfuric acid in the crystallizers at temperatures of about 50°–75° C. with contact times of about 1–8 hours.

42. A process according to claims 32 or 33 wherein a stream of monocalcium phosphate in phosphoric acid is removed from the system and the monocalcium phosphate is reacted with a (a) potassium sulfate, (b) potassium hydrogen sulfate, and (c) mixtures thereof, to produce $KH_2PO_4$, and $KH_2PO_4/H_3PO_4$ mixtures, and gypsum, and (d) sulfuric acid, to produce a quality grade phosphoric acid and gypsum.

43. A process according to claims 32 or 33 wherein a stream of monocalcium phosphate in phosphoric acid is removed from the system and the monocalcium phosphate is reacted with a member selected from the group consisting of (a) potassium sulfate, (b) potassium hydrogen sulfate, and (c) mixtures thereof, to produce $KH_2PO_4$, and $KH_2PO_4/H_3PO_4$ mixtures, and gypsum, and (d) sulfuric acid, to produce a quality grade phosphoric acid and gypsum.

44. A process for the production of phosphoric acid from phosphate ore which comprises the steps of:

(a) contacting said phosphate ore in a deslimer with a weak phosphoric acid solution to form a suspension of at least a portion of the slimes contained in the ore so that the slimes can be separated from the ore;

(b) separating the slime suspension to provide a deslimed phosphate ore;

(c) removing the deslimed phosphate ore to an acidulator and contacting said deslimed phosphate ore with a sufficient amount of a recycle calcium phosphate-phosphoric acid mixture in at least one acidulator to solubilize said phosphate ore so as to convert at least a portion of the calcium contained in the ore and form a solution of monocalcium phosphate in phosphoric acid containing sand solids, non-acidulated ore, and residual slimes;

(d) passing said solution, sand solids, non-acidulated solids and residual slimes through a separator to remove non-acidulated solids and sand as a slurry from a solution of monocalcium phosphate in phosphoric acid, said solution still containing residual slimes;

(e) passing the non-acidulated solids-sand slurry to at least a second acidulator and completing the solubilization of the phosphate ore by reaction of the slurry with recycle phosphoric acid and form a mixture of monocalcium phosphate in phosphoric acid, sand solids, and residual slimes;

(f) removing the resulting mixture to a separator, separating the sand solids, and recycling the solution of monocalcium phosphate in phosphoric acid, which still contains residual slimes, to the first acidulator;

(g) removing the solution of monocalcium phosphate in phosphoric acid from step (d) and dividing into two portions, both of said portions still containing residual slimes;

(h) contacting one of said portions with sufficient sulfuric acid in a first crystallizer to convert all the incoming calcium equivalent to the calcium in the ore to calcium sulfate, and wherein the sulfuric acid is added to the said portion at a sufficient rate to maintain a total $SO_3$ content in the first crystallizer solution of about 1.5 to 4.0 wt.% and form a mixture containing phosphoric acid and calcium sulfate;

(i) reacting the mixture from the first crystallizer with the remaining portion of the said solution in a second crystallizer, there being sufficient calcium in the said remaining portion to neutralize the $SO_3$ content in the mixture from the first crystallizer and form a phosphoric acid and calcium sulfate slurry;

(j) removing a portion of the resulting slurry and recycling to the second acidulator to solubilize additional phosphate ore;

(k) removing the remainder of the slurry to a separator and separating calcium sulfate solids from the phosphoric acid;

(l) recovering the phosphoric acid as product; and (m) washing the calcium sulfate solids with water or weak phosphoric acid and recycling the resultant wash water to the deslimer to deslime additional phosphate ore.

45. A process according to claim 44 wherein the slurry from the second crystallizer is removed to a settler and separated into a phosphoric acid solution overflow and a calcium sulfate slurry underflow; recycling at least a portion of the calcium sulfate slurry underflow to the said first crystallizer, and the remaining portion of the underflow to the calcium sulfate separator; passing the overflow to the second acidulator; and separating said remaining portion to recover calcium sulfate and phosphoric acid product.

46. A process according to claims 44 or 45 wherein the phosphate ore is low grade phosphate ore having a BPL content of 10 to 40%.

47. A process according to claims 44 or 45 wherein the phosphate ore is phosphate matrix.

48. A process according to claims 44 or 45 wherein the recycle wash water has a $P_2O_5$ content of about 1-20 wt. %.

49. A process according to claims 44 or 45 wherein a flocculant is added to the slime suspension to assist in solids separation.

50. A process according to claims 44 or 45 wherein a slime filtrate is separated from the slime solids, and at least a portion is recycled to the deslimer.

51. A process according to claims 44 or 45 wherein at least a portion of the slime filtrate is mixed with the deslimed phosphate ore.

52. A process according to claims 44 or 45 wherein the deslimed phosphate ore is solubilized in the acidulator by reaction with recycle calcium sulfate phosphoric acid slurry containing about 25-45 wt. % $P_2O_5$ at a temperature of about 40°-90° C., a residence time of about ½-8 hours, and a recycle ratio of $P_2O_5$ in the recycle acid to $P_2O_5$ in the rock of about 7:1 to 18:1.

53. A process according to claims 44 or 45 wherein the solution of monocalcium phosphate in phosphoric acid is reacted with the sulfuric acid in the crystallizer at temperatures of 50°-80° C. with contact times of 1-8 hours.

54. A process according to claims 44 or 45 wherein a stream of monocalcium phosphate in phosphoric acid is removed from the system and the monocalcium phosphate is reacted with a member selected from the group consisting of (a) potassium sulfate, (b) potassium hydrogen sulfate, and (c) mixtures thereof, to produce $KH_2PO_4$, and $KH_2PO_4/H_3PO_4$ mixtures, and gypsum, and (d) sulfuric acid, to produce a quality grade phosphoric acid and gypsum.

55. A process according to claims 44 or 45 wherein a stream of monocalcium phosphate in phosphoric acid is removed from the system and the monocalcium phosphate is reacted with a member selected from the group consisting of (a) potassium sulfate, (b) potassium hydrogen sulfate, and (c) mixtures thereof, to produce $KH_2PO_4$, and $KH_2PO_4/H_3PO_4$ mixtures, and gypsum, and (d) sulfuric acid, to produce a quality grade phosphoric acid and gypsum.

* * * * *

UNITED STATES PATENT OFFICE
CERTIFICATE OF CORRECTION

Patent No. 4,393,032          Dated July 12, 1983

Inventor(s) Erhart K. DRECHSEL, Dysart E. HOLCOMB, John B. SARDISCO

It is certified that error appears in the above-identified patent and that said Letters Patent are hereby corrected as shown below:

Column 1, line 32, change "$Ca_4(PO_4)_6 \cdot CaF_2$" to --$Ca_9(PO_4)_6 \cdot CaF_2$--.

Column 3, line 55, change "phorphoric" to --phosphoric--.

Column 4, line 20, change "5,160,657" to --4,160,657--.

Column 7, line 35, change "and" to --the--.

Column 7, line 13, change "(e)" to --(f)--.

Column 7, line 21, change "(f)" to --(g)--.

Column 7, line 22, change "(g)" to --(h)--.

Column 8, line 17, delete "a".

Column 8, line 22, change "and" to --and/or--.

Column 8, lines 42-43, delete "be the concentrate product from the flotation step which has" and insert --have--.

UNITED STATES PATENT OFFICE
CERTIFICATE OF CORRECTION

Patent No. 4,393,032          Dated July 12, 1983

Inventor(s) Erhart K. DRECHSEL, Dysart E. HOLCOMB, John B. SARDISCO

It is certified that error appears in the above-identified patent and that said Letters Patent are hereby corrected as shown below:

Column 9, line 16, change "5" to --15--.

Column 9, line 46, change "currently" to --usually--.

Column 11, line 47, change "slime" to --slimes--.

Column 25, line 2, change "IX" to --VII--.

Column 25, line 3, change "X" to --VIII--.

Column 28, line 15, change "containing" to --contacting--.

Signed and Sealed this

Third Day of July 1984

[SEAL]

*Attest:*

*Attesting Officer*

GERALD J. MOSSINGHOFF

*Commissioner of Patents and Trademarks*